US008726964B2

(12) United States Patent
Fenzi

(10) Patent No.: US 8,726,964 B2
(45) Date of Patent: May 20, 2014

(54) APPARATUSES AND METHODS FOR DECORATING OBJECTS

(75) Inventor: Giancarlo Fenzi, Illasi (IT)

(73) Assignee: Decoral System USA Corp., Coral Springs, FL (US)

( * ) Notice: Subject to any disclaimer, the term of this patent is extended or adjusted under 35 U.S.C. 154(b) by 1475 days.

(21) Appl. No.: 12/300,271

(22) PCT Filed: May 9, 2007

(86) PCT No.: PCT/IB2007/001203
§ 371 (c)(1),
(2), (4) Date: Feb. 4, 2009

(87) PCT Pub. No.: WO2007/129210
PCT Pub. Date: Nov. 15, 2007

(65) Prior Publication Data

US 2009/0320748 A1 Dec. 31, 2009

(30) Foreign Application Priority Data

May 10, 2006 (IT) ............................ MO2006A0145
Dec. 21, 2006 (IT) ............................ MO2006A0412

(51) Int. Cl.

| | |
|---|---|
| ***B29C 65/56*** | (2006.01) |
| ***B29C 65/72*** | (2006.01) |
| ***B65C 9/06*** | (2006.01) |
| ***B32B 37/10*** | (2006.01) |
| ***B32B 38/14*** | (2006.01) |
| *B32B 37/02* | (2006.01) |
| *B32B 37/14* | (2006.01) |

(52) U.S. Cl.
USPC ........... 156/567; 156/285; 156/384; 156/447; 156/582

(58) Field of Classification Search
USPC .................. 156/447, 567, 582, 277, 285, 384
See application file for complete search history.

(56) References Cited

U.S. PATENT DOCUMENTS

| | | | | |
|---|---|---|---|---|
| 3,261,734 A | | 7/1966 | Long | |
| 4,294,637 A | * | 10/1981 | Rump | 156/157 |
| 4,362,594 A | * | 12/1982 | Nagano et al. | 156/567 |
| 4,662,966 A | | 5/1987 | Sumi et al. | |
| 5,650,028 A | | 7/1997 | Brandt et al. | |
| 5,798,017 A | * | 8/1998 | Claveau | 156/382 |

(Continued)

FOREIGN PATENT DOCUMENTS

| | | |
|---|---|---|
| DE | 19741476 A1 * | 3/1999 |
| EP | 0 110 220 A2 | 6/1984 |

(Continued)

OTHER PUBLICATIONS

English translation of EP0110220; Jun. 13, 1984.*

(Continued)

*Primary Examiner* — Sonya Mazumdar
(74) *Attorney, Agent, or Firm* — Laubscher & Laubscher, P.C.

(57) ABSTRACT

Apparatus for decorating objects including a heating device for heating an object wrapped in a transferring support bearing a sublimable image and a conveying device for conveying the object into, and removing the object from, the heating device, the conveying device being mainly movable in a substantially vertical direction. The conveying device is provided with a supporting element such as to convey one object at a time to the heating device via inlet and outlet openings on the same side of the heating device.

30 Claims, 17 Drawing Sheets

(56) References Cited

U.S. PATENT DOCUMENTS

| | | | | |
|---|---|---|---|---|
| 5,799,574 | A * | 9/1998 | Williams et al. | 101/40 |
| 6,167,805 | B1 * | 1/2001 | Williams et al. | 101/40 |
| 6,423,169 | B1 | 7/2002 | Cobb | |
| 6,769,357 | B1 * | 8/2004 | Finan | 101/38.1 |
| 8,011,922 | B2 * | 9/2011 | Checcucci | 432/144 |
| 2002/0148054 | A1 | 10/2002 | Drake | |
| 2009/0165959 | A1 * | 7/2009 | Checcucci et al. | 156/380.9 |

FOREIGN PATENT DOCUMENTS

| | | | |
|---|---|---|---|
| EP | 0 810 102 | A1 | 12/1997 |
| EP | 1 055 524 | A1 | 11/2000 |
| EP | 1055524 | A1 * | 11/2000 |
| FR | 2 409 153 | A1 | 3/1982 |
| FR | 2 661 370 | A1 | 10/1991 |
| WO | WO 96/29208 | A1 | 9/1996 |
| WO | WO 02/43970 | A2 | 6/2002 |
| WO | WO 2007129210 | A2 * | 11/2007 |

OTHER PUBLICATIONS

English translation of FR2409153; Mar. 19, 1982.*
English translation of FR2661370; Oct. 31, 1991.*

* cited by examiner

APPARATUSES AND METHODS FOR DECORATING OBJECTS

This application is a national stage entry of PCT International Application No. PCT/IB2007/001203 filed May 9, 2007. PCT/IB2007/001203 claims priority to IT Application No. MO2006A000145 filed May 10, 2006 and to IT Application No. MO2006A000412 filed Dec., 21 2006. The entire contents of these applications are incorporated herein by reference.

The invention relates to apparatuses and methods for decorating objects, particularly elongated objects such as section bars, or web-shaped elements, through sublimation of inks. The apparatuses and methods according to the invention enable any type of design to be transferred to the objects, in particular patterns that reproduce the veining of wood or marble, floral figures and fancy designs. The section bars decorated with the apparatuses and methods according to the invention can be used in building, for example to construct fixtures for doors or windows, in furnishing, design or the like.

Apparatuses are known for decorating section bars, comprising a closed-loop conveying system provided with two end chains, on each of which there is mounted a plurality of sucking terminals, or sucking mouths for sucking air.

Known apparatuses further comprise a kiln provided with an inlet opening and an outlet opening. The inlet opening is obtained on a first vertical wall of the kiln, opposite a second vertical wall on which there is obtained the outlet opening.

Each section bar is wrapped in a tubular enclosure having open ends, made of a film of plastics bearing a sublimable decoration printed onto a side thereof facing the section bar. The section bar is then loaded onto the conveying system and the sucking mouths are inserted into the open ends of the tubular enclosure, in such a way that each sucking mouth closes the corresponding end. The sucking mouths suck the air from the inside of the tubular enclosure, so as to make the film adhere to the external surface of the section bar.

Each sucking mouth is moved at the same speed as the section bars wrapped in the enclosures.

A first end of the sucking mouth is provided with a slidable ring nut for locking an edge of the open end of the enclosure.

A second end of the sucking mouth is fixed to a metal belt moved together with the sucking mouth along a closed path defined by the end chains.

Along a portion of the closed path, corresponding to the passage inside the kiln of the section bars wrapped in the enclosures, the metal belt defines a closure portion of the sucking conduit.

The sucking conduit comprises, in addition to the closing portion, a U-shaped fixed elongated body, closed at the ends and provided with longitudinal grooves covered with antifriction material.

Inside the longitudinal grooves the closing portion runs in such a way as to define a closed cavity.

The conduit is connected to vacuum pumps that suck out the air inside the tubular enclosure, such as to make the film adhere to the external surface of the section bar.

The conveying system moves the section bars along a horizontal path, making them enter the kiln one after the other through the inlet opening.

Each section bar remains in the kiln for sufficient time to reach a temperature at which the decoration sublimates, thus transferring from the film to the surface of the section bar. Subsequently, the section bars are extracted one after the other from the kiln through the outlet opening and freed from the enclosure.

Known apparatuses are rather bulky, especially because, in order to ensure good productivity, they require kilns to have a significant horizontal dimension, and more precisely a significant length. In order to house the known apparatuses, very great space is therefore necessary that can be found only inside very large manufacturing sheds or by sacrificing space available for adjacent apparatuses.

A drawback of known kilns is that the closure portion of the sucking conduit enables a significant amount of air to pass from the exterior to the closed cavity.

In particular, the air may enter inside the closed cavity by means of the longitudinal grooves inside which the closure portion slides.

The vacuum pumps are thus dimensioned in such a way as to make the film adhere to the external surface of the section bar despite the entry of air into the closed cavity.

This increases system costs due to the need to install more powerful vacuum pumps, and an increase in the energy required by the latter.

Another drawback of known kilns is that the respective conveying systems are not very versatile, since they are suitable for conveying the section bars only along horizontal paths. To the chains interposed between the end chains there are in fact fixed V-shaped supporting elements suitable for supportingly receiving the section bars wrapped in the corresponding tubular enclosure. If the chains conveyed the section bars in a non-horizontal direction, for example along a vertically path, the supporting elements would rotate together with the chains, which would make the section bars resting on the supporting elements fall.

The kilns that convey the section bars along horizontal paths require very extended surfaces in order that the section bar, whilst it is moved horizontally, remains a sufficiently long time inside the kiln to enable the design to be sublimated.

An object of the invention is to improve the apparatuses for decorating objects, particularly elongated or web-shaped elements, through sublimation.

Another object is to make sucking air from or sending air into a space defined between the object to be decorated and a film bearing a sublimable design placed in contact with the object simpler and less energy-expensive.

A further object is to provide apparatuses for decorating objects through sublimation that are more versatile than known apparatuses that in particular enable objects to be conveyed even along non-horizontal paths.

In a first aspect of the invention, there is provided an apparatus including a heating device for heating an object wrapped in a transferring support bearing a sublimable image, a conveying device for conveying the object to, and removing the object from, the heating device, wherein the conveying device is mainly movable in a substantially vertical direction.

In a second aspect of the invention, there is provided a method including conveying an object wrapped in a transferring support bearing a sublimable image into a heating device, so as to heat the object to transfer the image from the transferring support to the object, wherein, during conveying, the object is moved mainly along a substantially vertical direction.

Owing to the first and second aspect of the invention, it is possible to obtain an apparatus for transferring a sublimable image to an object having prevalently vertical overall dimensions and occupying reduced horizontal spaces. This enables the volume of industrial sheds to be exploited better, which are normally very tall and the height of which is hardly ever completely exploited.

In a third aspect of the invention, there is provided an apparatus including a heating device for heating objects wrapped in respective transferring supports bearing a sublimable image, a conveying device for conveying the objects into the heating device through an inlet opening and extracting the objects from the heating device through an outlet opening, the conveying device being provided with a supporting device such as to convey one object at a time into the heating device, wherein the inlet opening is obtained on a side of the heating device on which there is also obtained the outlet opening.

In a fourth aspect of the invention, there is provided a method for transferring sublimable images to objects, including introducing an object at a time into a heating device, the object being wrapped in a transferring support bearing a sublimable image, extracting the object from the heating device after the image has been transferred on the object, wherein the introducing and said extracting occur on the same side of the heating device.

In a fifth aspect of the invention, there is provided an apparatus including a conveying device for conveying an object associated with a sheet bearing a sublimable design, a conduit closed longitudinally by a closing portion for sucking air between the sheet and the object through a connecting device, wherein the connecting device is movable along the closing portion so as to move consecutive zones of the closing portion to define in the consecutive zones an opening through which the connecting device accesses the conduit.

Owing to the fifth aspect of the invention, it is possible to suck air between the object to be decorated and the sheet bearing the sublimable design in a more efficient manner than in the prior art.

The closing portion in fact normally maintains the conduit closed, preventing exchanges of air between the conduit and the external environment. The closing portion is opened only in the zones in which it interacts with the connecting device, as the connecting device moves along the closing portion. In this way the extent of the zones is reduced through which air can be exchanged between the conduit and the external environment.

This decreases the power of a possible suction system to create the vacuum inside the conduit.

Thus the apparatus according to the fifth aspect of the invention can be equipped with a suction system that is less powerful than known apparatuses, which enables the costs of the system and the quantity of energy required for operation to be reduced.

In a sixth aspect of the invention, there is provided an apparatus including a conveying device that is movable along a closed path for conveying an object associated with a sheet bearing a sublimable design and a suction device for sucking air between the object and the sheet, the conveying device including a loop conveyor and a further loop conveyor that are movable on respective movement planes that are parallel to one another, the conveying device including a supporting surface for supporting the object. A control device for maintaining the supporting surface is provided substantially parallel to itself along the closed path, the control device including an arm device having an arm and a further arm rotatably connected to a member with which the supporting surface is associated, the arm having an end zone connected to the loop conveyor along a connecting axis and the further arm having a further end zone connected to the further loop conveyor along a further connecting axis arranged at a distance from the connecting axis.

Owing to the control device, the path along which the object to be decorated is moved can extend in a non-horizontal direction, for example a vertical direction. In fact, the control arrangement maintains the tilt of the supporting surface substantially constant regardless of the direction of the path, so that the supporting surface can support the object correctly. The apparatus according to the sixth aspect of the invention is therefore particularly versatile.

The invention can be better understood and implemented with reference to the attached drawings that illustrate some embodiments thereof by way of non-limiting example, in which.

Figure 1:
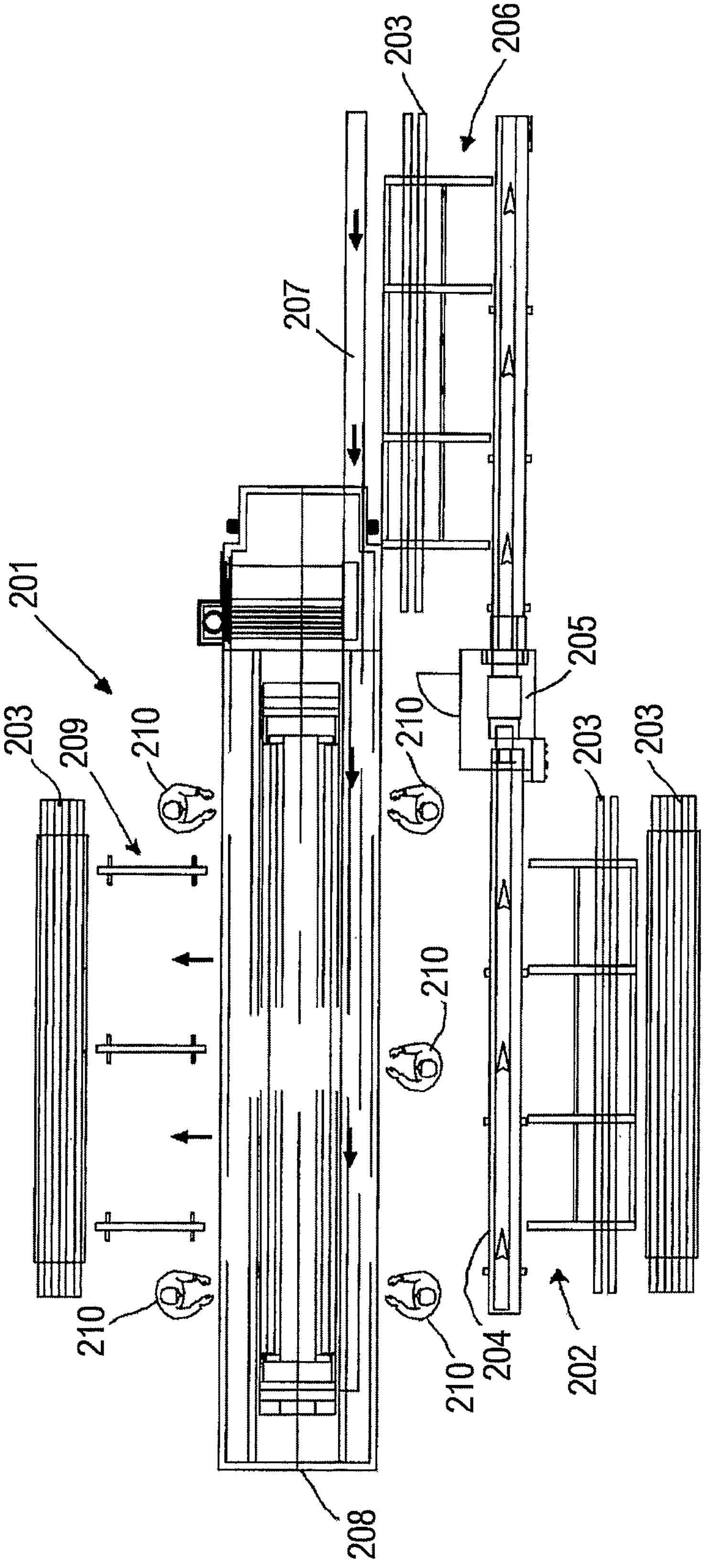
FIG. 1 is a schematic plan view of a system in which there is included an apparatus for decorating section bars according to the invention.

In FIG. 1 there is illustrated a system 201 for decorating objects 203, in particular elongated objects such as section bars, through the transfer of images made with sublimable inks. The section bars can be made of metal, for example aluminium or plastics, for example polyvinyl chloride (PVC), and can be used in the building industry, particularly for producing door and window frames. The sublimable images transferred onto the section bars may reproduce the veining of wood, the appearance of marble or of natural stone or any other desired pattern.

The system 201 comprises a loading bench 202 from which the section bars 203 are conveyed to a first conveyor 204 that conveys the section bars 203 to a so-called "wrapping" machine 205, in which each section bar 203 is wrapped in a tubular enclosure having open ends, made of a film made of plastics bearing a sublimable decoration printed on a side thereof facing the section bar 203. The section bars 203 wrapped in the aforesaid film are conveyed to an accumulating bench 206, and, subsequently, to a second conveyor 207 that conveys the section bars 203 to a loading zone adjacent to a heating device 208 according to the invention, in which the section bars 203 are transferred manually by operators 210. The section bars 203 are heated inside the heating device 208 in such a way as to sublimate the inks with which the decorations are made that are printed on the film made of plastics of the enclosures, so that the decorations are transferred onto the section bars 203. At the exit from the heating device 208, the section bars 203 are transferred by the operators 210 to an unloading plane 209 for subsequent sorting into storage positions.

Figure 2:
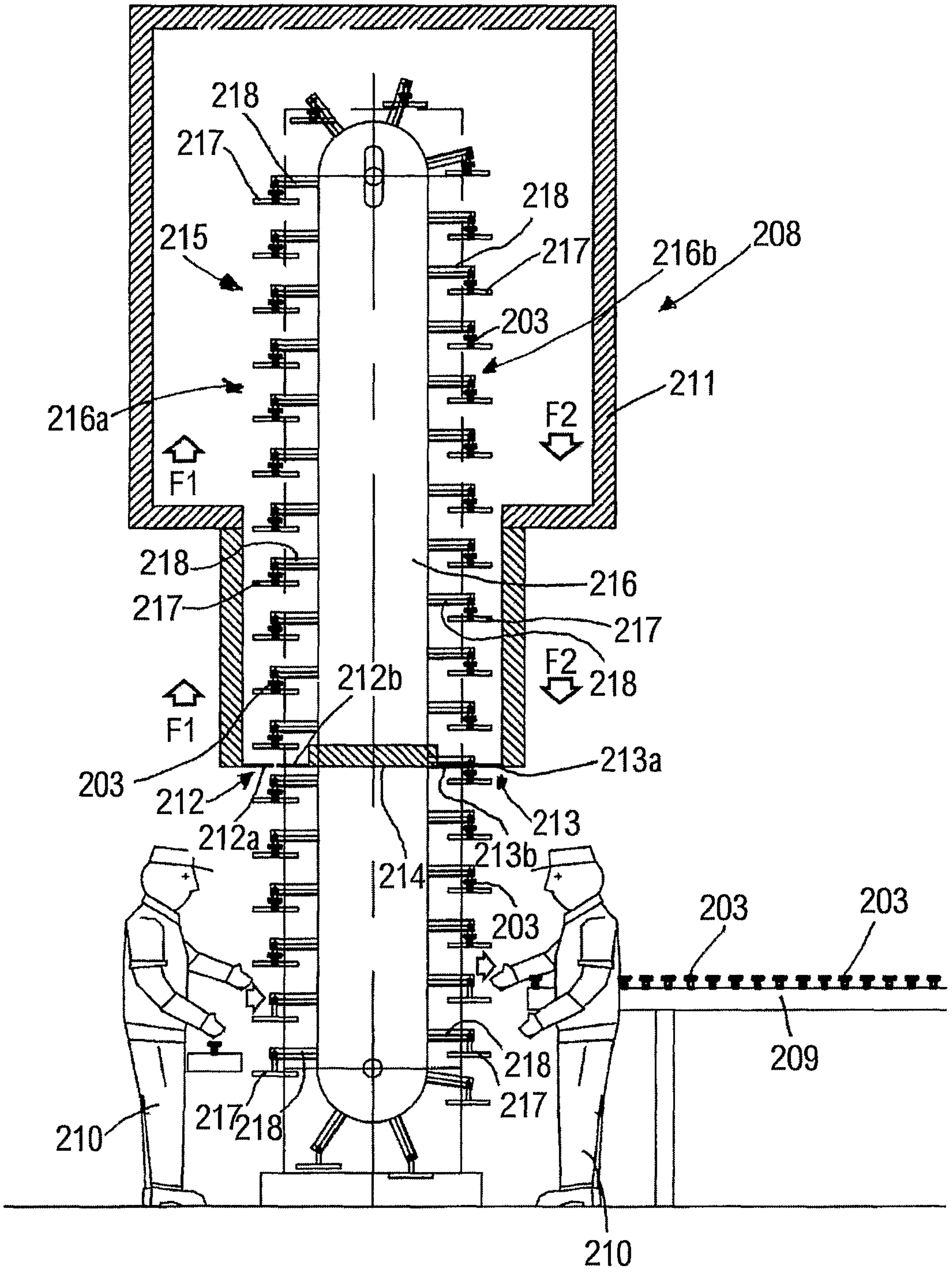
FIG. 2 is a schematic cross section of a heating device of an apparatus according to the invention.
Figure 3:
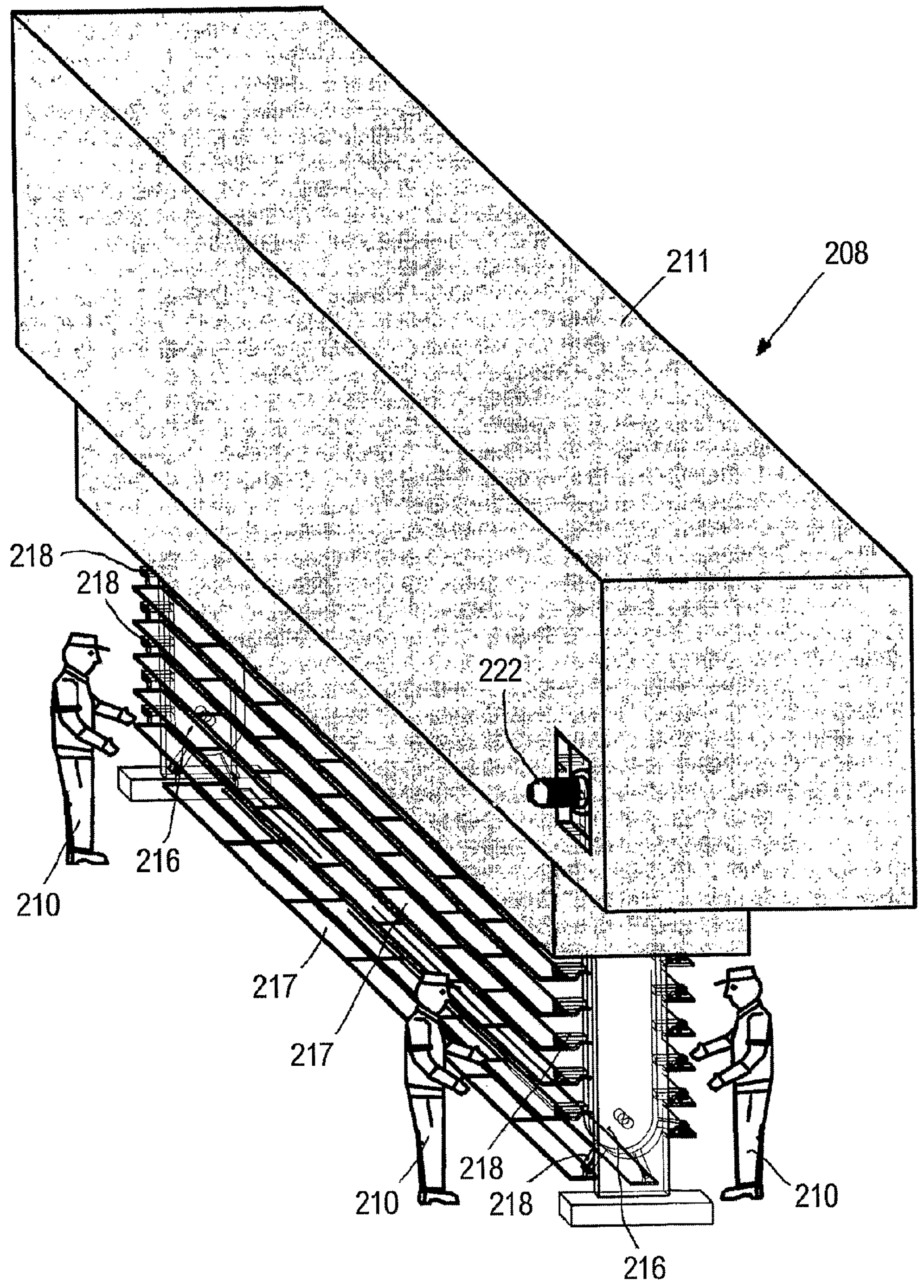
FIG. 3 is a perspective view of the heating device in FIG. 2.
Figure 4:
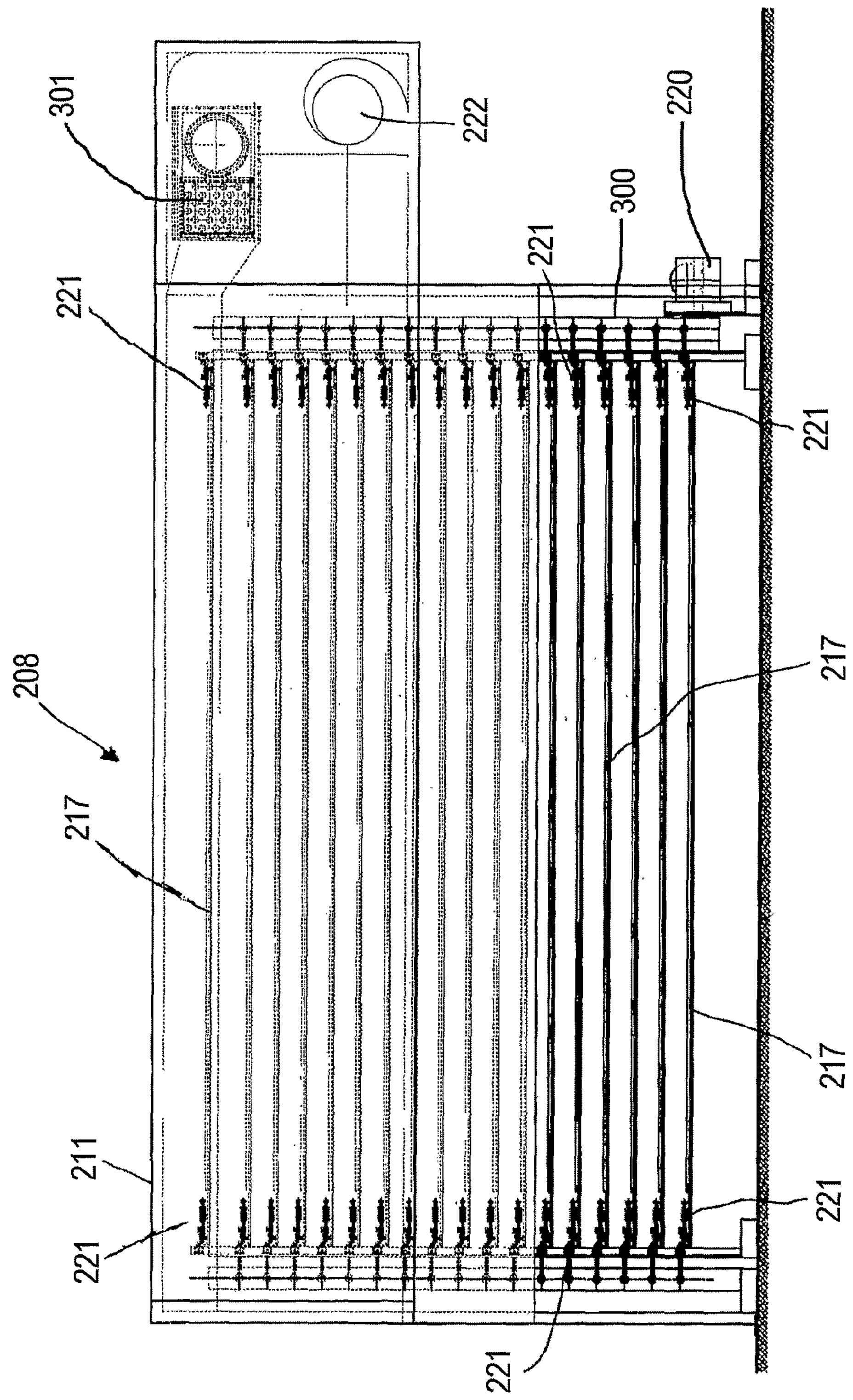
FIG. 4 is a schematic longitudinal section of a heating device of an apparatus according to the invention.

In FIGS. 2, 3 and 4 there is shown the heating device 208 of an apparatus according to the invention.

The heating device 208 comprises a body 211 provided with an inlet opening 212 and with an outlet opening 213, obtained in the same wall of the body 211, for example in a lower wall 214 of the body 211.

The body 211 is provided internally with a heating device, comprising a burner 301 and a fan 222, for heating the section bars 203, with the respective enclosures, up to a temperature that is sufficient to cause sublimation of the inks with which the decorations found on said enclosures are made.

The heating device 208 includes a conveying device 215, intended for introducing the section bars 203 inside the body 211, through the inlet opening 212 and extracting them from the body 211 through the outlet opening 213.

The inlet opening 212 is provided with a pair of elastic closing elements 212*a*, 212*b*, suitable for separating the inside of the heating device 208 from the external environment to prevent, or at least greatly limit, dispersion of heat from the heating device 208 to the external environment. The outlet opening 213 is provided with a pair of elastic closing elements 213*a*, 213*b* that are similar to the elements 212*a* and 212*b*. The elastic elements 212*a*, 212*b* and 213*a*, 213*b* of each pair are suitable for being deformed elastically to enable the objects 203 to enter the heating device 208 and exit it. The conveying device 215 includes a pair of conveying elements 216 with a prevalently vertical and closed-loop extent, for example in the form of chains, arranged at opposite ends of the body 211. The conveying elements 216 are driven by a motor 220. Each conveying element 216 includes an ascending branch 216*a* by means of which the section bars 203 are inserted into the heating device 208 and a descending branch 216*b*, by means of which the section bars 203 are extracted from the heating device 208.

Between the two conveying elements 216 supporting elements 217 extend, the respective ends of which are connected to an end of a respective shelf 218, the opposite end of which is fixed to a respective conveying element 216.

The shelves 218 are distributed with a substantially uniform pitch along the respective conveying element 216. The connections of the supporting elements 217 to the shelves 218 are made in such a way that the supporting elements 217 are substantially horizontal along the entire path inside the body 211. The connections of the supporting elements 217 to the shelves 218 can be of the hinge type.

At the ends of each supporting element 217 there is arranged a respective suction element 221 communicating with a channel 300 connected to a suction device, for example a vacuum pump, which is not shown. The suction elements 221 of each supporting element 217 are inserted into the respective open ends of the tubular enclosure into which a section bar 203 has been inserted to make, through the suction device, a vacuum inside the enclosure, which is used to make the enclosure adhere tightly to the surface of the section bar 203.

The operation of a system 201 according to the invention occurs in the following manner: the section bars 203, placed on the first conveyor 204 pass through the "wrapping" machine 205 in which each is wrapped in a respective tubular enclosure, on the internal surface of which, facing the section bar 203, decorations are made obtained with hot sublimable inks. The section bars 203 wrapped in the aforementioned tubular enclosure are transferred to the second conveyor 207, which conveys them to the heating device 208. Each section bar 203, when it reaches the heating device 208, is transferred by an operator 210 to a respective supporting element 217 of the connected conveying device 215, via the pairs of shelves 218, to the respective ascending branches 216*a* of the conveying elements 216. The suction elements 221 associated with the respective supporting element 217 are inserted into the ends of the enclosure in which the section bar 203 is wrapped, in such a way as to create within the enclosure a vacuum that makes the enclosure adhere tightly to the surface of the section bar 203. The conveying elements 216 convey the section bars 203 inside the heating device 208, moving the section bars 203 in a first substantially vertical direction, indicated, in FIG. 2, by the arrows F1. Each supporting element 217, having reached the end of the ascending branch 216*a* of the conveying elements 216 is conveyed downwards, in a second substantially vertical direction, substantially parallel to the first substantially vertical direction, along the descending branches 216*b* of the conveying elements 216, until it exits through the outlet opening 213 of the body 211, to then be removed by an operator 210 and placed on the unloading plane 209, to then be extracted from the respective enclosure.

The aforesaid second direction is indicated, in FIG. 2, by the arrows F2.

Whilst they are inside the heating device 208, the enclosures in which the section bars 203 are wrapped are heated to a temperature that is sufficient to bring about sublimation of the inks with which the decorations are made on the face of each enclosure adhering to the surface of the respective section bar 203. Owing to the sublimation of the inks, the decorations are transferred completely to the surface of the respective section bar 203.

The conveying elements 216 of the conveying device 215 can be moved by the motor 220 at a speed that is such as to enable the operators 210 to deposit and remove the section bars 203 from the supporting elements 217 and to obtain a time of presence of the section bars 203 inside the heating device 208 that is sufficient to bring about the complete sublimation of the inks with which the decorations were created to be transferred to the surface of the section bar. The conveying elements 216 are moved in an indexed manner, but they can also be moved in a continuous manner.

Just before, or immediately after, the exit of the objects 203 from the heating device 208, pressurised air is sent through the elements 221 in such a way as to cause the tubular enclosures to become detached from the surface of the objects 203, to facilitate the removal of the tubular enclosures.

Figure 5:
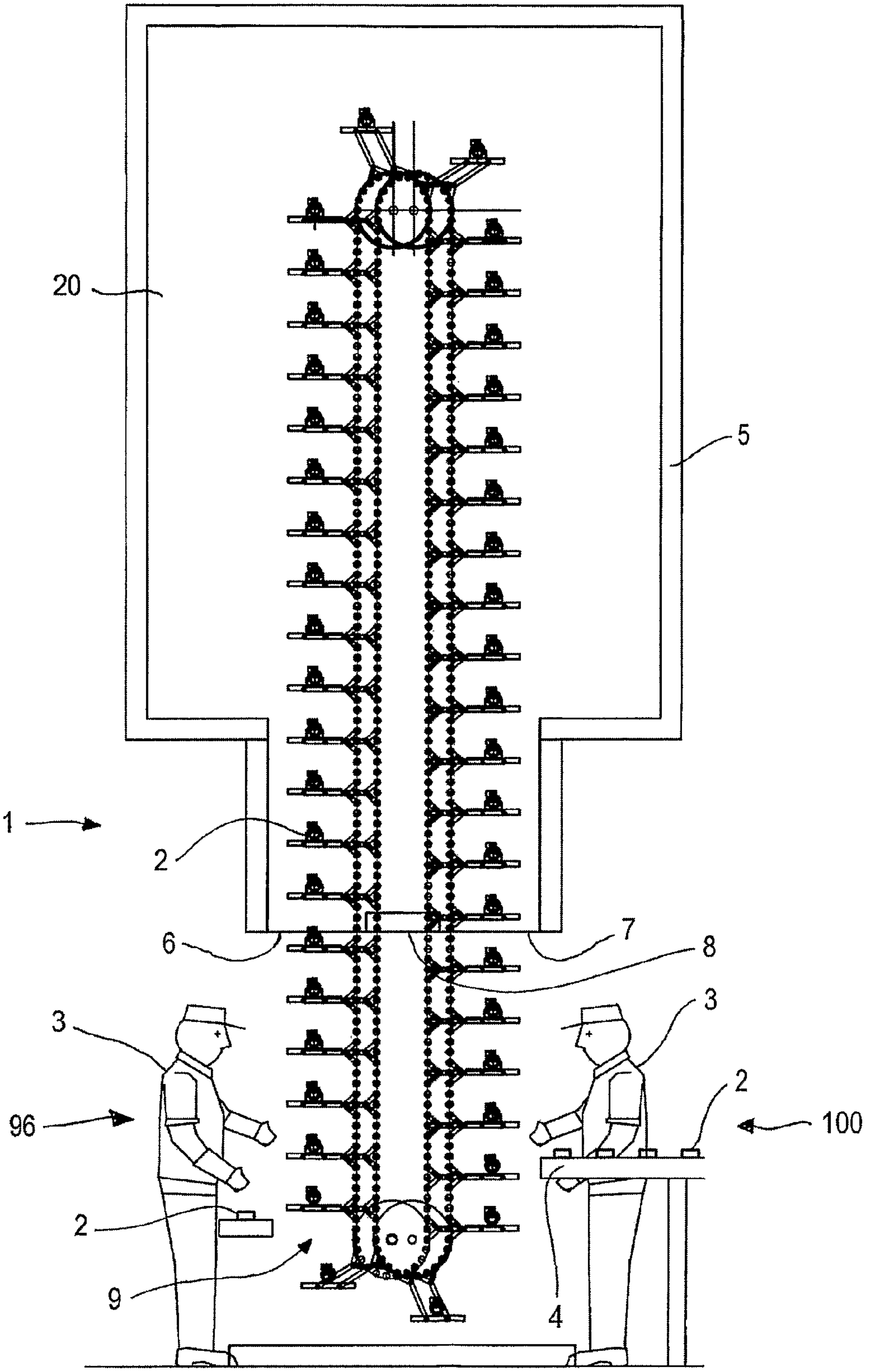
FIG. 5 is a partially sectioned lateral view of an apparatus for decorating by sublimation objects of elongated shape.

FIG. 5 shows an apparatus 1 for decorating objects, such as section bars 2, via sublimable inks, that partially differs from the apparatus disclosed previously with reference to FIGS. 1 to 4, as will be disclosed here below. Each section bar 2 is wrapped, by devices that are not shown, in a tubular enclosure 134 provided with open ends 133, shown in FIGS. 20 to 22, similarly to what has been disclosed with reference to the apparatus in FIGS. 1-4.

The section bars 2 wrapped in the respective tubular enclosures 134 are transferred manually by operators 3 onto the apparatus 1.

The apparatus 1 comprises a heating device 5 provided with a chamber 20, with an inlet opening 6 and with an outlet opening 7, made in a same wall of the chamber 20, for example in a lower wall 8 of the latter.

The heating device 5 is provided with a heating device including, for example, a burner and a fan, not shown in the Figure, and similar to those disclosed for the apparatus in FIGS. 1-4, for heating the section bars 2, inside the chamber 20, to a temperature that is sufficient for causing sublimation of the inks with which the sublimable images are created.

At the outlet of the heating device 5, the section bars 2 are transferred by the operators 3 to an unloading plane 4 for subsequent sorting into storage positions.

The apparatus 1 further comprises a conveying device 9, arranged for introducing the section bars 2 inside the chamber 20 through the inlet opening 6, moving them inside the chamber 20 and extracting them from the heating device 5 through the outlet opening 7.

The inlet opening 6 is provided with an insulating element that is not shown, for example made of elastic material, which insulating element is suitable for separating the inside of the chamber 20 from the external environment to prevent, or at least greatly limit heat dispersion from the heating device 5 to the external environment.

The insulating element is further such as to enable the section bars 2 moved by the conveying device 9 to enter the chamber 20.

The outlet opening 7 is provided with a further insulating element that is not shown that is similar to the insulating element disclosed above and suitable for enabling the section bars 2 to exit the chamber 20.

The insulating element and the further insulating element may be similar to the elastic closing elements (212*a*, 212*b*; 213*a*, 213*b*) of the apparatus disclosed previously with reference to FIGS. 1-4.

Figure 6:
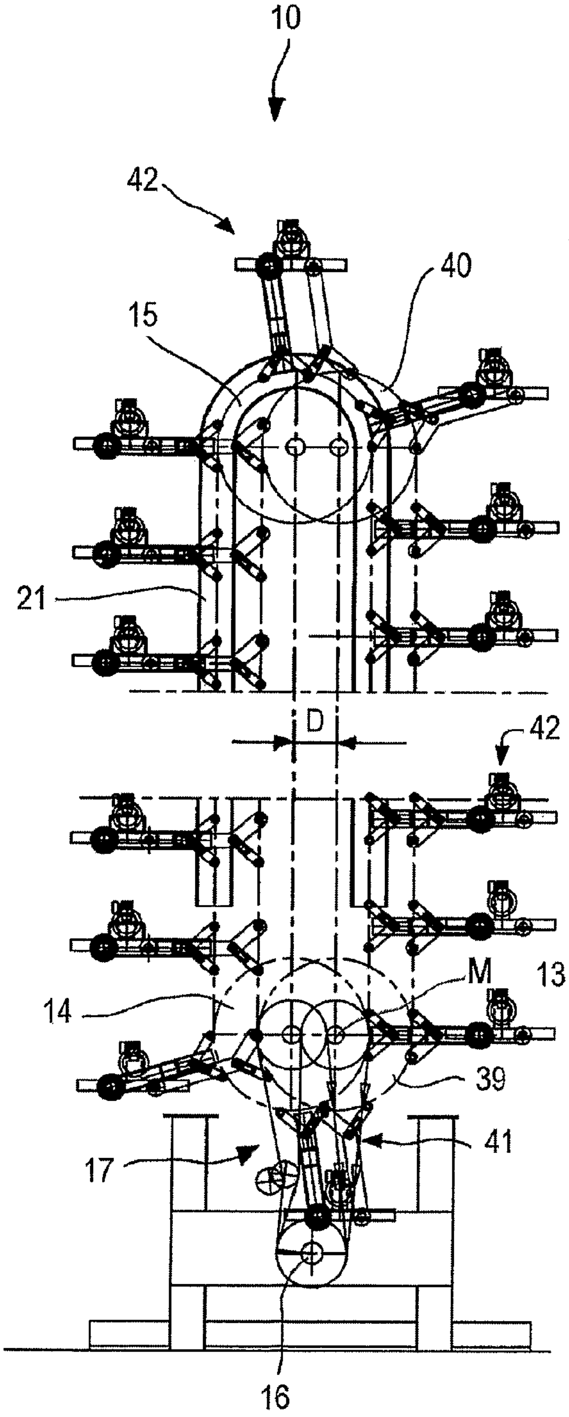
FIG. 6 is a schematic and fragmentary lateral view of an end device for conveying the objects of elongated shape.
Figure 7:
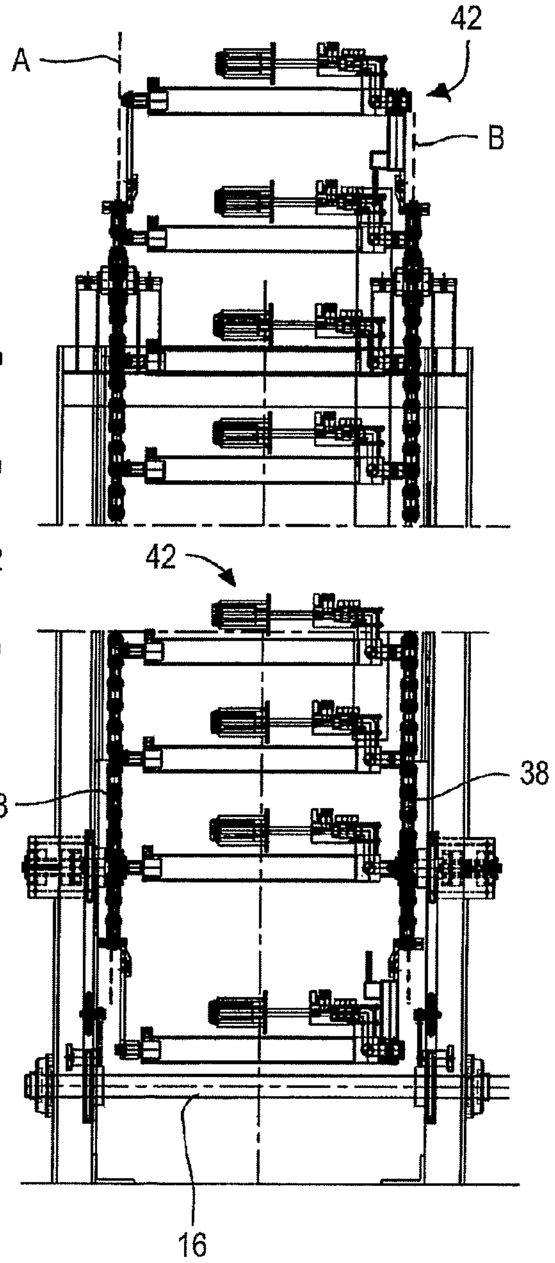
FIG. 7 is a fragmentary frontal view of the end device in FIG. 6.

The conveying device 9 comprises an end device 10, shown schematically in FIGS. 6 and 7, with a prevalently vertical extent, for supporting and moving an end portion 131 of the section bars 2, and a further end device 11 that is similar to the end device 10, arranged for supporting and moving a further end portion 132 of the section bars 2.

As will be explained below, the section bars 2 are moved by the conveying device 9 in such a way as to maintain themselves in a substantially horizontal position.

Figure 8:
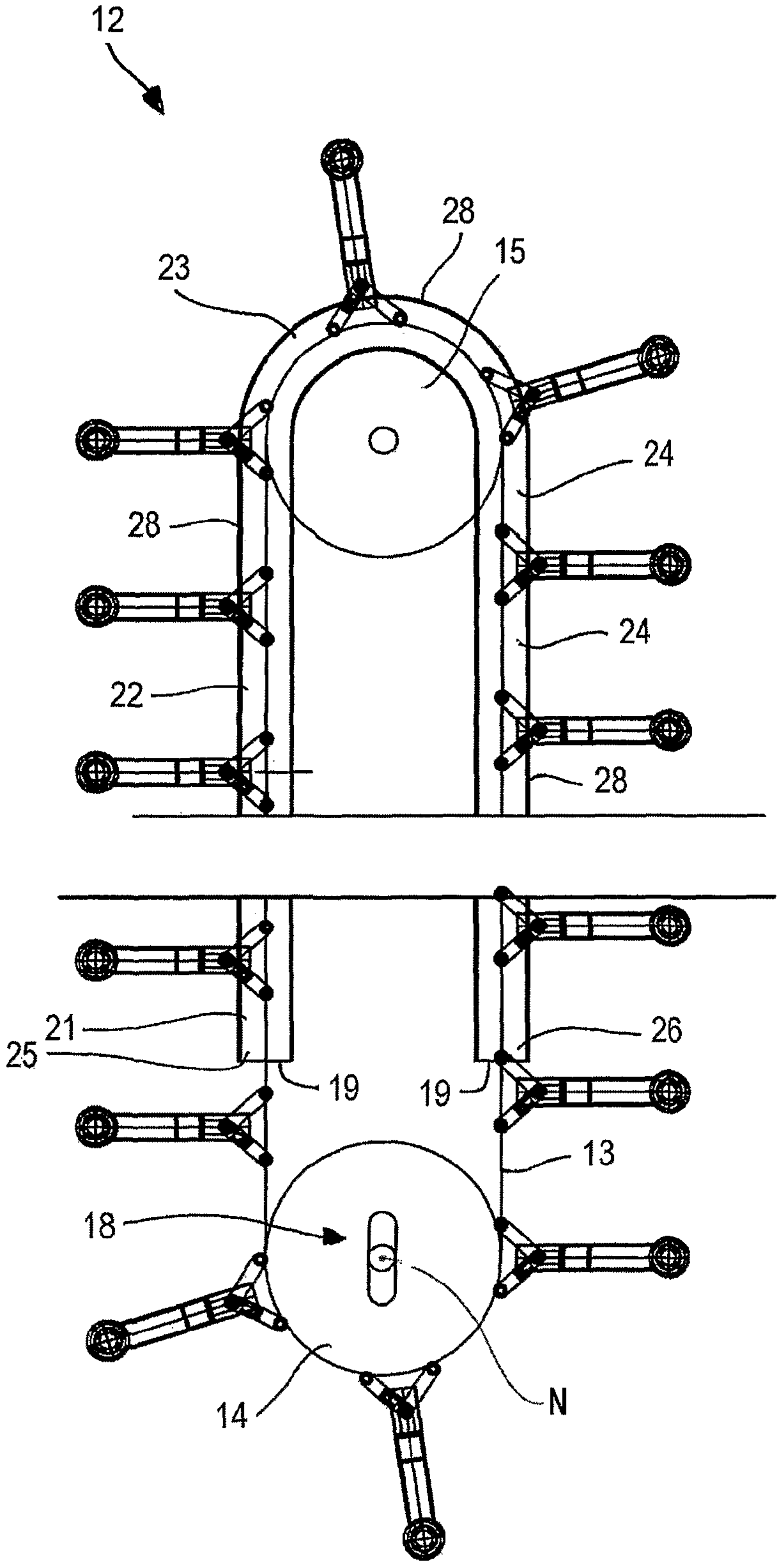
FIG. 8 is a schematic and fragmentary lateral view of a first portion of the end device in FIG. 6.

As shown in FIG. 8, the end device 10 comprises a first portion 12 having a closed-loop chain 13, represented schematically in FIG. 8 by an unbroken line that engages a drive wheel 14 and a driven wheel 15.

The path followed by the chain 13 defines a first movement plane A indicated in FIG. 7.

The drive wheel 14 is situated outside the chamber 20 and is connected via a belt 17, shown in FIG. 6, to a motor shaft 16 moved by a motor that is not shown.

The drive wheel 14 rotates around an axis N.

The drive wheel 14 is provided with a tensioning device 18 arranged for varying the position at which the drive wheel 14 is positioned and thus for tensioning the chain 13.

The driven wheel 15 is on the other hand situated inside the chamber 20 and is substantially vertically superimposed on the drive wheel 14.

The first portion 12 further comprises a conduit maintained in a vacuum during operation of the apparatus 1, through a sucking device that is not shown.

The conduit 21 extends along an upper part of the path of the chain 13.

In particular, the conduit 21 is formed by a first rectilinear branch 22, terminating in an end zone 25, by a curved portion 23, and by a second rectilinear branch 24 terminating in a second end zone 26.

The first end zone 25 and the second end zone 26 of the conduit 21 are positioned at a higher position than that of a loading zone 96 and of an unloading zone 100 (FIG. 5) occupied by the operators 3 entrusted with loading the section bars 2 onto the apparatus 1 and unloading them therefrom.

Figure 9:
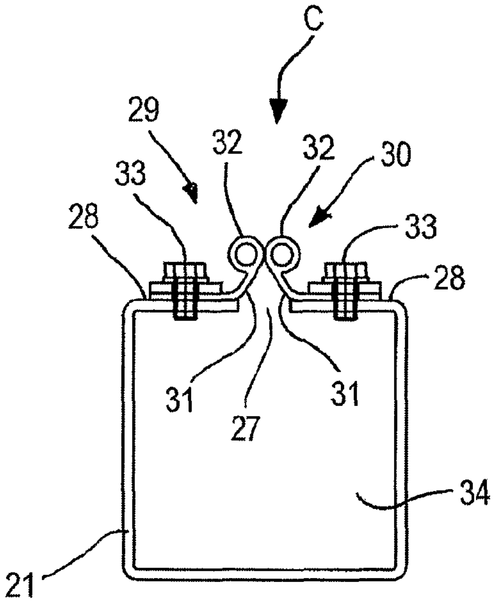
FIG. 9 is a cross section of a conduit in a closed configuration.

As shown in FIG. 9, the conduit 21 has a substantially square section and is provided with a slit 27 with a constant width that extends on an external wall 28 of the conduit 21 for the entire length of the latter.

The conduit 21 is closed by transverse walls 19 near the first end 25 and the second end 26.

Alongside the slit 27 and for the entire length thereof, there is fixed an elastic closing device 29.

The closing arrangement 29 defines a closing portion 30 of the conduit 21.

The closing arrangement 29 comprises a first closing arrangement and a second closing arrangement fixed to respective edge zones, opposite one another, of the slit 27.

The first closing arrangement and the second closing arrangement are made of elastic material, for example silicone, that is deformable and resistant to high temperatures.

Figure 10:
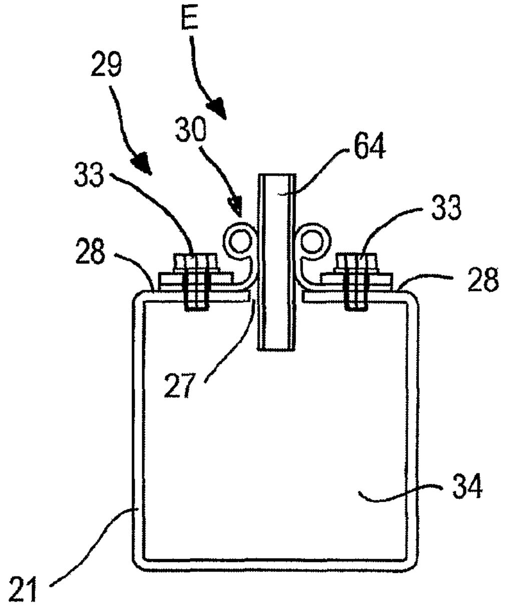
FIG. 10 is a cross section of the conduit in FIG. 9 in an open configuration.

In one embodiment, the first closing arrangement and the second closing arrangement may each include a seal 31 provided with ends with a substantially cylindrical section 32 as shown in FIGS. 9 and 10.

In particular, as shown in FIG. 9, the seals 31 are fixed by screws 33 to the external wall 28 of the conduit 21.

Figure 11:
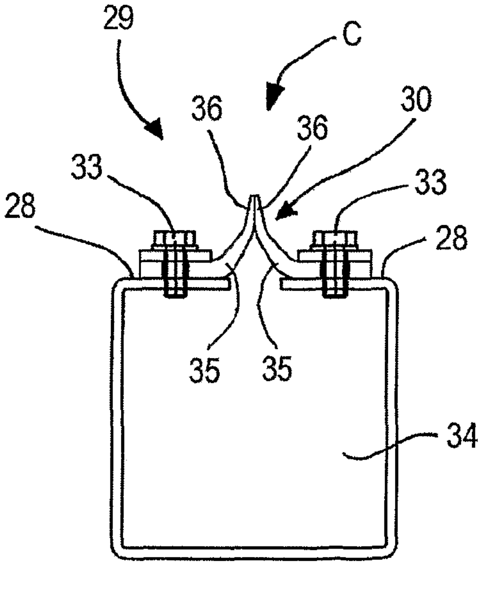
FIG. 11 is a cross section of conduit according to a further embodiment of the invention in a closed configuration.

In a further embodiment, as shown in FIG. 11, the first closing arrangement and the second closing arrangement may each be provided with a fin 35 fixed through screws 33 to the external wall 28. The fins 35 have a curved section and are in contact with one another in an end portion 36 thereof.

The closing portion 30 is normally in a closed configuration C, shown in FIGS. 9 and 11, in which the slit 27 is sealed. There is thus isolated, inside the conduit 21, an internal cavity 34 that, during operation of the apparatus 1, is connected to the sucking device.

The sucking device, by sucking air inside the conduit 21, maintains in contact with one another the ends with a substantially cylindrical section 32 of the seals 31 or the end portions 36 of the fins 35.

This contributes to creating a closing arrangement 29 of the slit 27 that is still more efficient.

Figure 14:
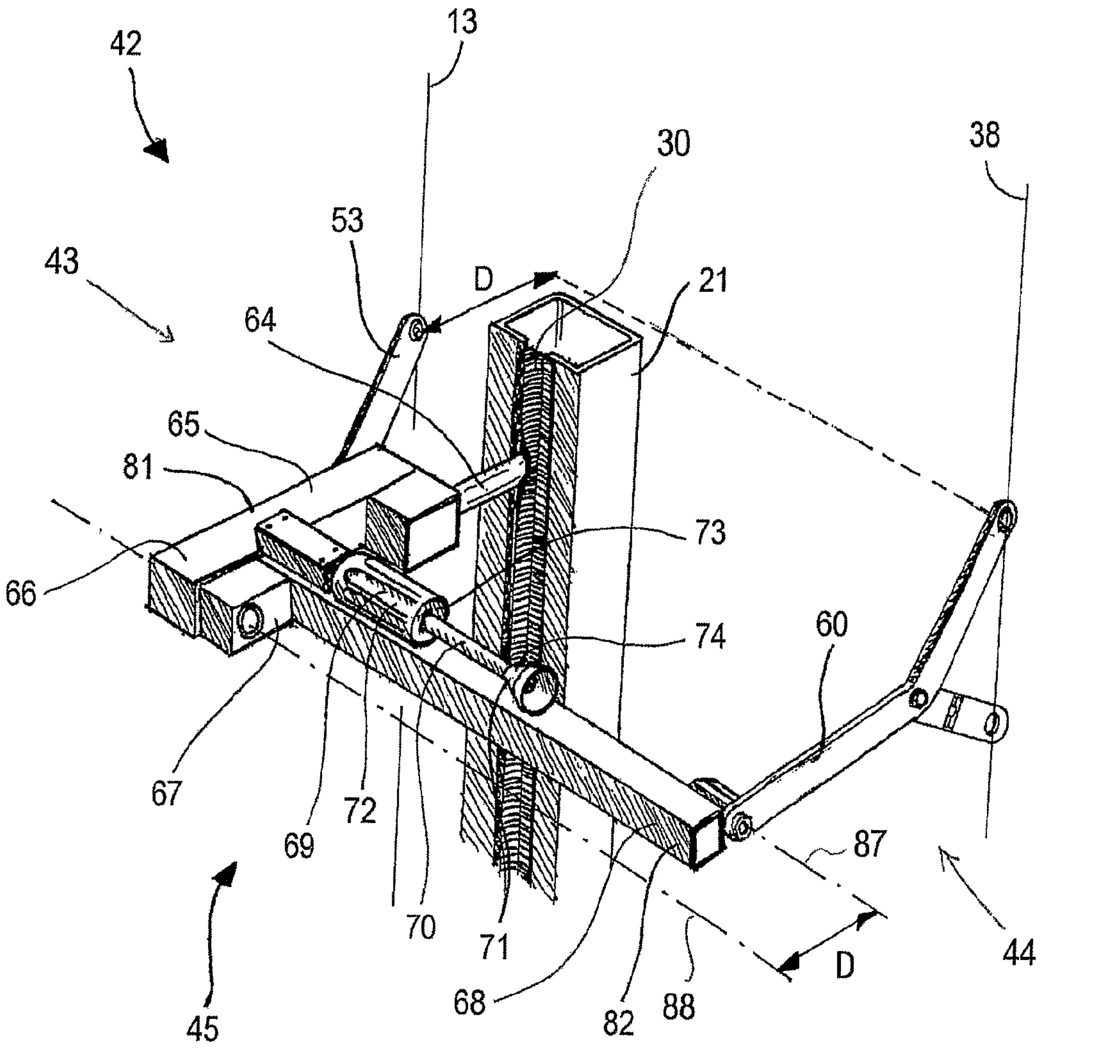
FIG. 14 is a perspective view of a connecting device in a first position.

As shown in FIG. 14, the end device 10 comprises a connecting device 45 for connecting the conduit 21 to the tubular enclosure 134, so as to suck air inside the tubular enclosure 134 and make the latter adhere to the section bar 2.

Figure 12:
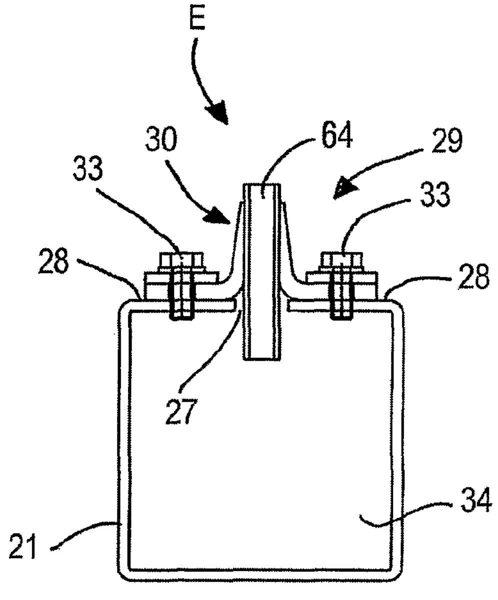
FIG. 12 is a cross section of the conduit in FIG. 11 in an open configuration.

The connecting device 45 comprises a tubular component or sleeve 64, that is movable inside the slit 27 so as to interact with successive zones of the closing portion 30 and to deform in sequence such zones, in which the closing portion 30 is moved to an open configuration E as shown in FIGS. 10 and 12. In the open configuration E, the sleeve 64 moves the first closing arrangement away from the second closing arrangement, defining between the first closing arrangement and the second closing arrangement an opening by means of which the sleeve 64 is inserted into the internal cavity 34. When the sleeve 64 moves along the slit 27, also the aforesaid opening moves, so as to maintain the connecting device 45 in communication with the internal cavity 34. The zones of the closing portion 30 that have already interacted with the sleeve 64 close again to limit the loss of air.

In order to move the first closing arrangement away from the second closing arrangement more easily, the sleeve 64 has a narrow and elongated cross section having a greater dimension parallel to an advance direction of the sleeve 64 along the slit 27.

The end device 10 further comprises a second portion 37, having a structure substantially similar to the first portion 12 and positioned prevalently on a second movement plane B, visible in FIG. 7. The second movement plane B is defined by the path of a further chain 38 and is parallel to the first movement plane A.

The second portion 37, similarly to the first portion 12, comprises a further drive wheel 39 and a further driven wheel 40 on which the further chain 38 is wound as a loop.

The further chain 38, the further drive wheel 39 and the further driven wheel 40 are functionally and structurally similar to the corresponding components in the first portion 12.

Unlike the first portion 12, the second portion 37 is not provided with a conduit.

Projecting the first portion 12 and the second portion 37 onto a common vertical plane, for example, onto the plane in FIG. 6, it is noted that the second portion 37 is spaced by a distance D from the first portion 12, the distance D being measured along a horizontal direction.

Figure 18:
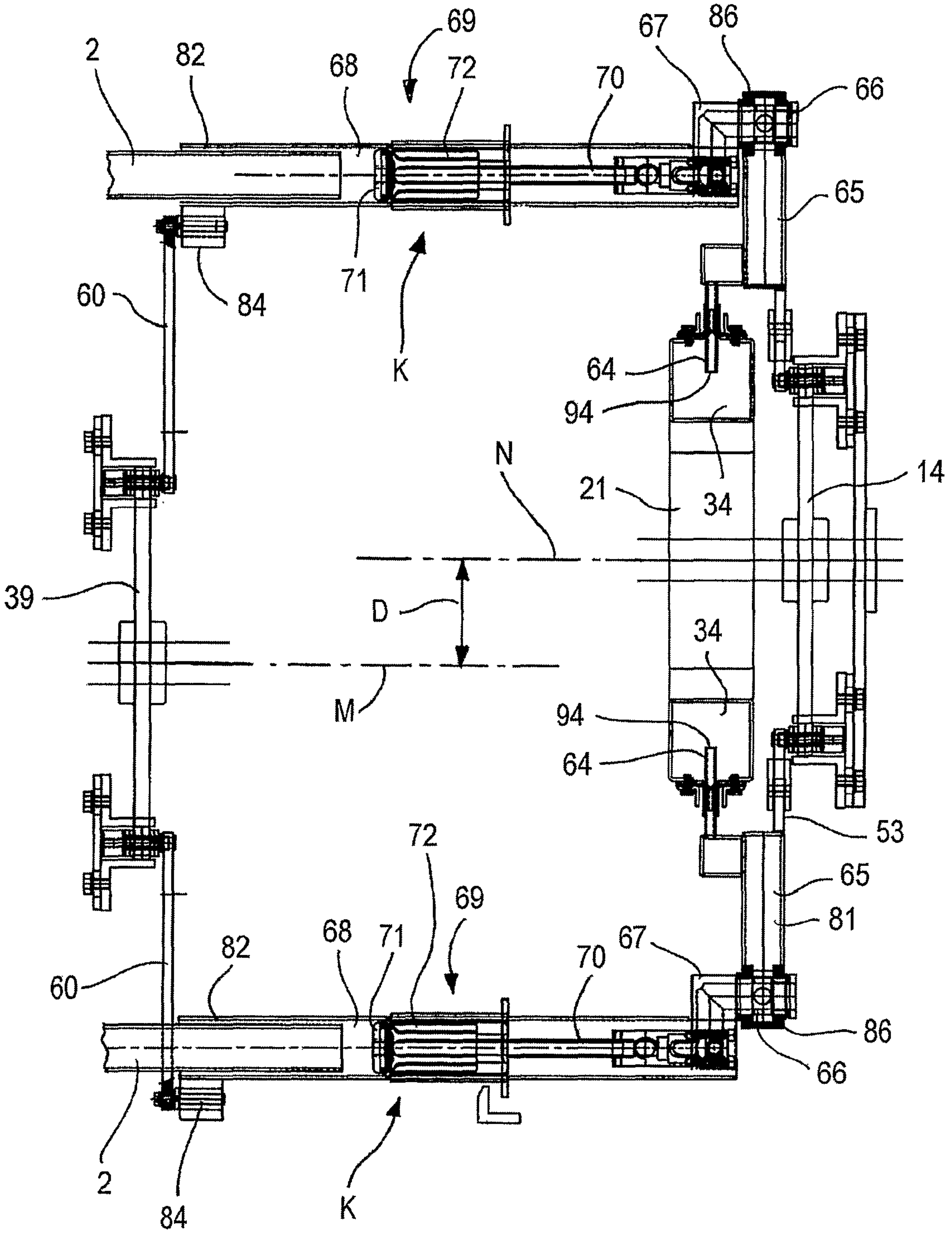
FIG. 18 is a partially sectioned plan view of the end device in FIG. 7.

The second portion 37 is thus arranged in such a way that a further axis M around which the further drive wheel 39 rotates is parallel to the axis N of the drive wheel 14 and is placed at a distance that is equal to the distance D from the axis N, as shown in FIG. 18.

The further drive wheel 39 is further provided with a further tensioning device not shown in the Figures, that is similar to the already disclosed tensioning device 18.

The further drive wheel 39 is connected via a further belt 41, shown in FIG. 6, to the motor shaft 16 and is moved at the same speed as that at which the drive wheel 14 is moved.

Consequently, also the chain 13 and the further chain 38 are moved at the same speed.

Figure 13:
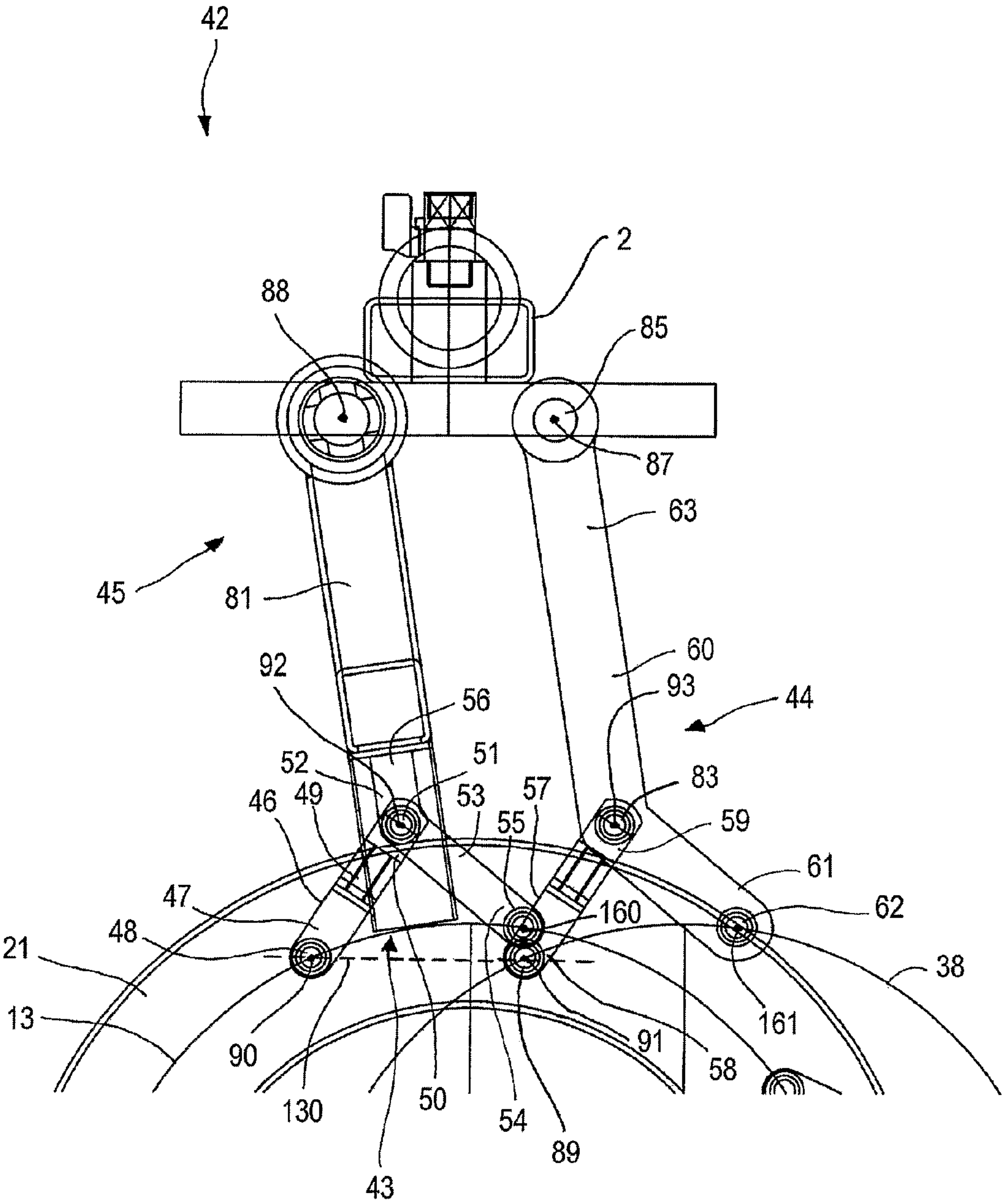
FIG. 13 is an enlarged detail of the apparatus in FIG. 6.

As shown in FIG. 13, the end device 10 comprises a connecting device 45 to connect the conduit 21 to the tubular enclosure 134, so as to suck air inside the tubular enclosure 134 and make the latter adhere to the section bar 2.

The end device 10 further comprises a first supporting device 43 and a second supporting device 44 for supporting the corresponding connecting device 45.

The first supporting device 43 comprises a first adjustable bracket 46.

The first adjustable bracket 46 comprises a first end 47, provided with a first hole 48 and connected rotatably, for example, via a bolt connection, to a first link, not shown, of the chain 13.

The first adjustable bracket 46 comprises a second end 50 the distance of which from the first end 47 can be adjusted by an adjusting device 49.

The adjusting device 49 can, for example, be made by fixing to the first end 47 a threaded shank with which a nut is coupled that is rotatably connected to the second end 50.

The second end 50 is provided with a second hole 51 via which the first adjustable bracket 46 is rotatably connected to a central zone 52 of a first supporting bracket 53 included in the first supporting element 43.

The first supporting bracket 53 comprises two rectilinear portions tilted with respect to one another so as to define, with the first adjustable bracket 46, a Y-shaped structure. The first supporting bracket 53 is provided with a first end zone 54, having an end hole 55 and connected along a connecting axis 160, for example, via a bolt connection, to a second link, which is not shown, of the chain 13.

A second end zone 56 of the first supporting bracket 53 is fixed to the connecting device 45.

By adjusting, via the adjusting device 49, the position of the second end 50 of the first adjustable bracket 46, it is thus possible to rotate the first supporting bracket 53 around a pin that is not shown in the figure, which is inserted into the hole 55 and is integral with the chain 13.

The second supporting device 44 comprises a second adjustable bracket 57.

The second adjustable bracket 57 is shaped similarly to the first adjustable bracket 46 and is provided with a further first end 58, provided with a further first hole 89 and rotatably connected to a further first link, which is not shown, of the further chain 38.

A further second end 59 of the second adjustable bracket 57, provided with a further second hole 83, is rotatably connected to a second supporting bracket 60.

The second supporting bracket 60 is provided with a further first end zone 61, having a further end hole 62 and connected along a further connecting axis 161 to a further second link, which is not shown, of the further chain 38.

The second supporting bracket 60 comprises two rectilinear portions tilted in relation to one another, in such a way as to define, together with the second adjustable bracket 57, a Y-shaped structure.

A further second end zone 63 of the second supporting bracket 60, obtained on a longer rectilinear portion of the corresponding rectilinear portion of the first supporting bracket 53 is provided with a second end hole 85 and is rotatably connected to the connecting device 45.

In particular, the connecting device 45 can rotate with respect to the first supporting bracket 53 around a first rotation axis 87, visible in FIG. 13.

Also the angle identified between the further chain 38 and the second supporting bracket 60 can be varied by adjusting, via the second adjustable bracket 57, the position of the second supporting bracket 60.

As shown in FIGS. 14 to 19 and as previously disclosed, the connecting device 45 comprises the sleeve 64, which is connected in an end section thereof to an inlet mouth of an L-shaped box body 65.

Figure 16:
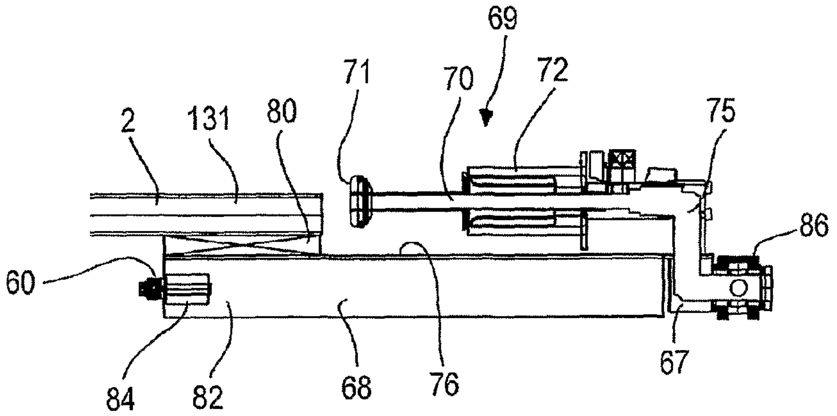
FIG. 16 is a frontal view of a connecting device showing a conduit.
Figure 17:
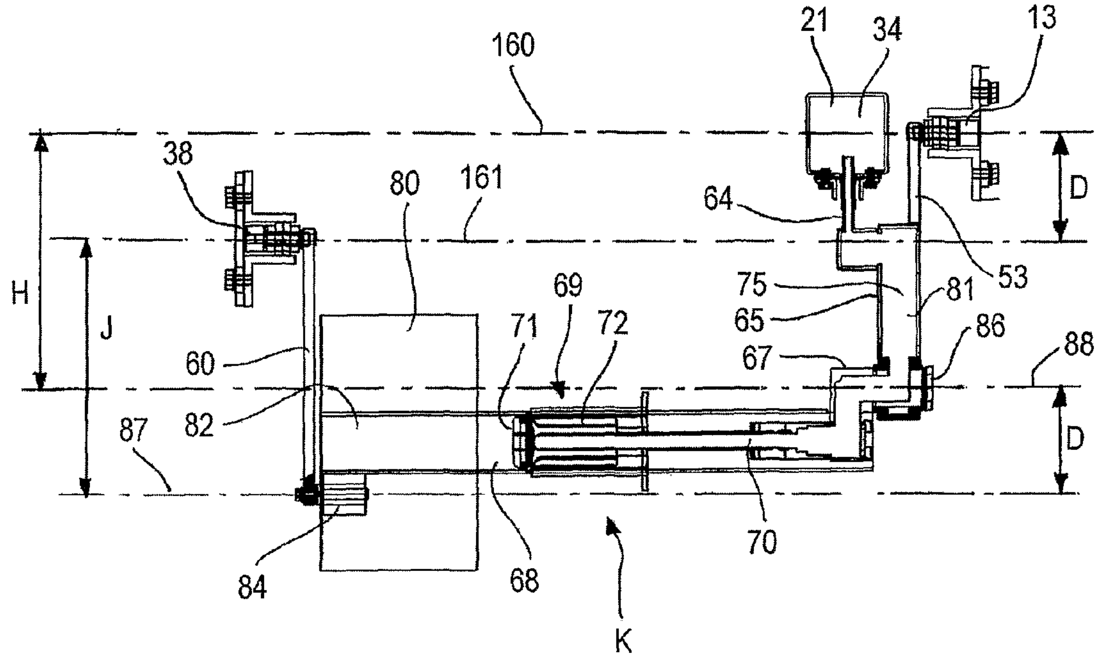
FIG. 17 is a plan view of the connecting device in FIG. 16.
Figure 20:
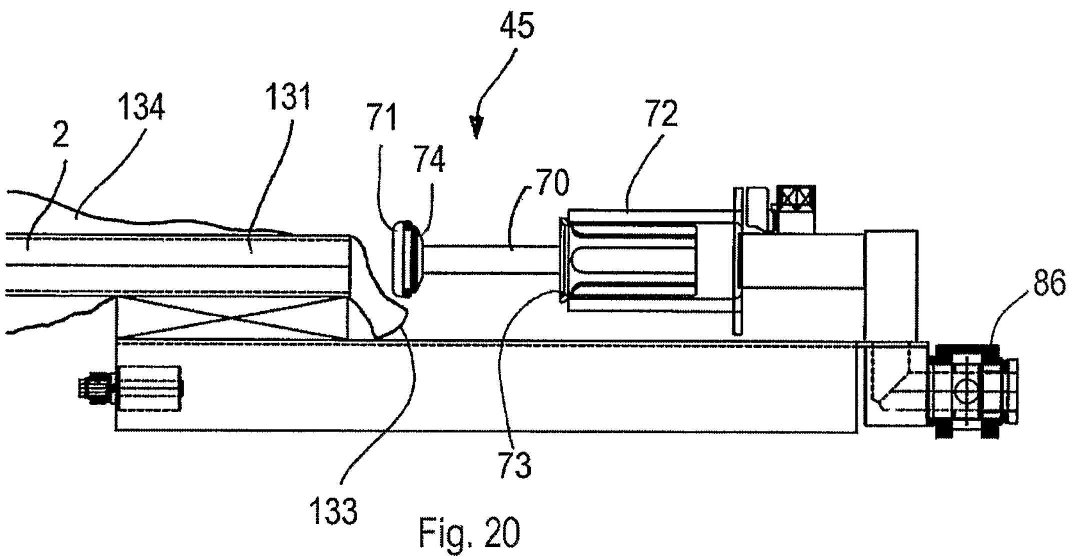
FIGS. 20 to 22 are frontal views of the connecting device in FIG. 16 during subsequent steps of a sequence of loading an object of elongated shape onto the apparatus in FIG. 5.
Figure 21:
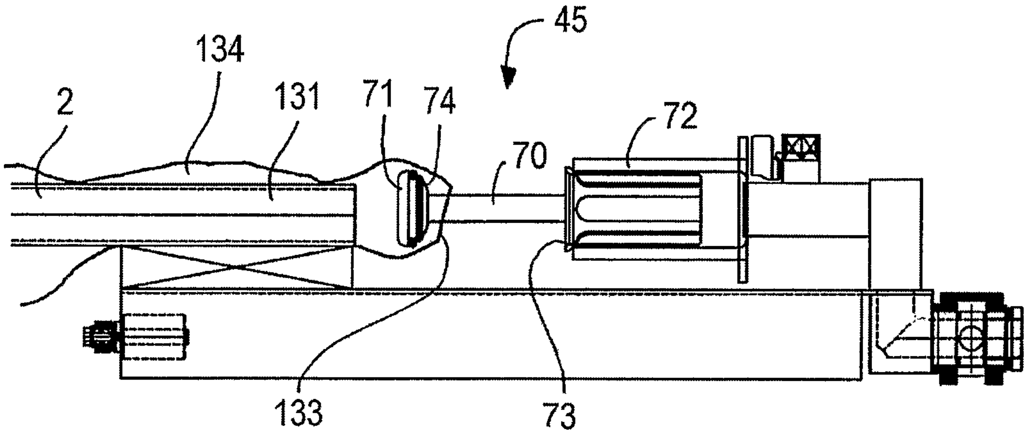

An end region 66 of the box body 65 is provided with a rotating joint 86, visible in FIGS. 16, 17 and 20, by means of which the box body 65 can rotate with respect to a hollow element 67 around a second rotation axis 88, shown in FIG. 13.

The hollow element 67 is further fixed to a supporting element 68 of elongated shape that is suitable for supporting the section bar 2 and to a sucking end 69 suitable for closing the tubular enclosure 134 and sucking air between the tubular enclosure 134 and the section bar 2.

The sucking end 69 comprises a tubular element 70 ending in a sucking mouth 71 and a ring nut 72 that is slidable on the tubular element 70.

The ring nut 72 can slide to the sucking mouth 71 and reach a locking configuration K in which one of the two open ends 133 of the tubular enclosure 134, inside which the section bar 2 is wrapped, is locked between a first conical surface 73 of the ring nut 72 and a second conical surface 74 of the sucking mouth 71, shown in FIG. 14.

In the locking configuration K, the sucking mouth 71 faces a space defined between the tubular enclosure 134 and the section bar 2.

In FIGS. 17 and 18 the visible ring nuts 72 are in the locking configuration K.

Inside the connecting device 45 there is defined a duct 75, clearly shown in FIGS. 16 and 17, which connects the sucking mouth 71 to the sleeve 64.

The duct 75 passes through the sleeve 64, the box body 65, the rotating joint 86, the hollow element 67 and the tubular element 70.

The supporting element 68 has an upper surface 76 arranged for supporting the end portion 131 of the section bars 2. Alternatively, according to needs, there can be installed various accessory devices on the supporting element 68.

Figure 19:
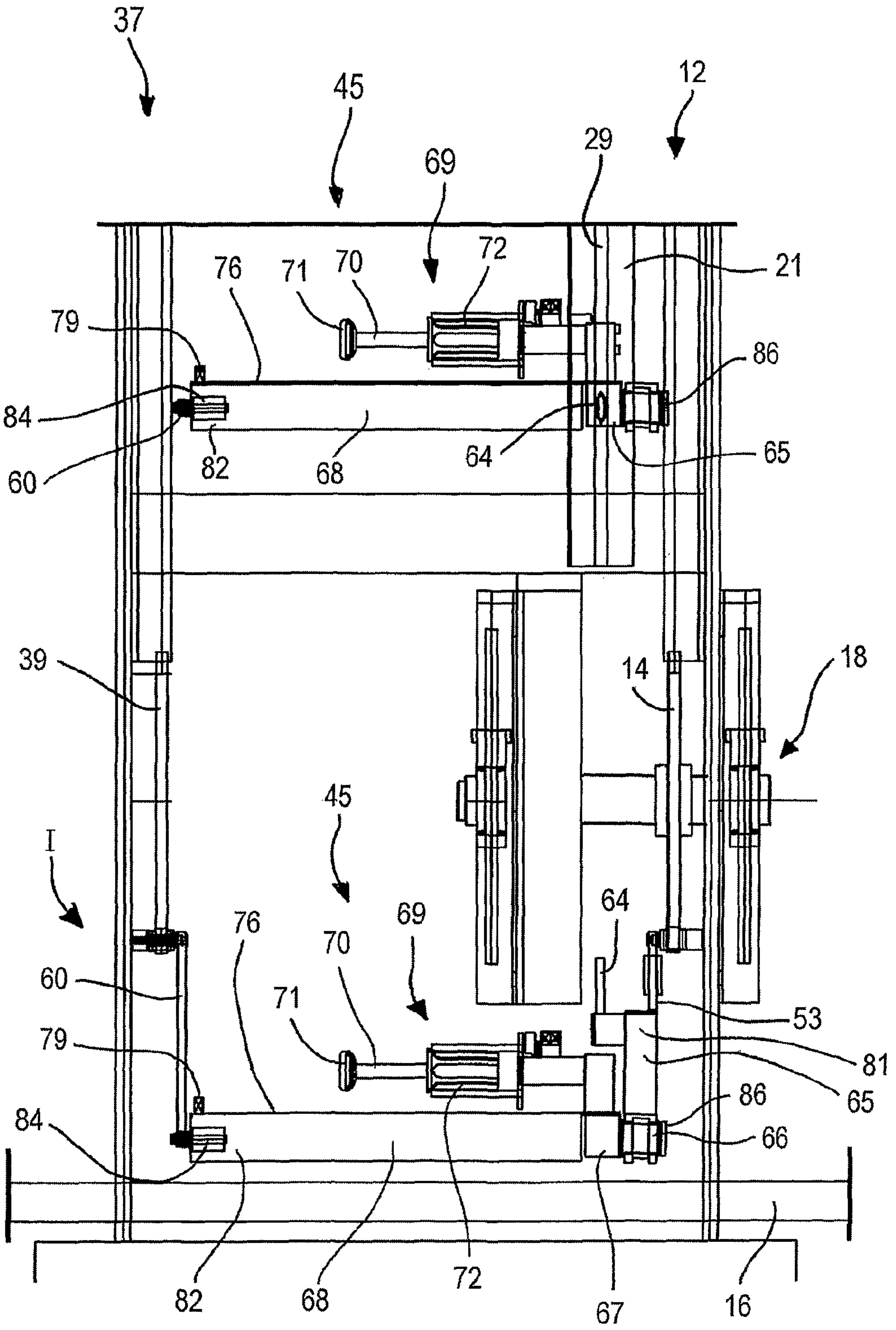
FIG. 19 is an enlarged and schematic detail of a lower portion of the end device in FIG. 7.

For example, on the supporting element 68 there can be fixed a spacer 79, as shown in FIG. 19, that enables the section bar 2 to be positioned at a height at which the section bar 2 is substantially aligned on the sucking mouth 71, making more simple the operation of locking one of the two open ends 133 of the tubular enclosure 134.

If the supporting element 68 has to support a section bar 2 having a relatively great cross section, or a slab-shaped element, on the supporting element 68 there can be mounted a resting plate 80, as shown in FIGS. 16 and 17.

The connecting device 45 is connected to the chain 13 via the first supporting device 43 and to the further closed-loop chain 38 via the second supporting device 44.

More in particular, the first supporting bracket 53 is fixed to a longitudinal portion 81 of the box body 65 in such a way that the longitudinal portion 81 is arranged, together with the first supporting bracket 53, on a plane parallel to the first movement plane A.

Similarly, a final portion 82 of the supporting element 68 has a lateral protuberance 84 on a side of which there is rotatably connected the second supporting bracket 60.

The connecting device 45 is made in such a way that the distance between the first rotation axis 87 and the second rotation axis 88 is equal to the distance D.

To the chain 13 there is fixed a plurality of first supporting devices 43 that are substantially equidistant from one another.

On the further chain 38 there is fixed a plurality of second supporting devices 44 arranged in positions corresponding to the first supporting devices 43.

In particular, the second supporting devices 44 are arranged in such a way that a plane 130, visible in FIG. 13, defined by an axis 90 of the first hole 48 and by a further axis 91 of the further first hole 89, is substantially horizontal.

As the chain 13 and the further chain 38 move in a synchronised manner, the plane 130 remains substantially horizontal in any position of the path of the closed-loop chain 13 and of the further chain 38.

The first adjustable bracket 46 and the second adjustable bracket 57 are adjusted in such a way as to obtain, between a first axis 92 of the second hole 51 and a second axis 93 of the further second hole 83, a distance equal to the distance D.

The further second end zone 63 of the second supporting bracket 60 is substantially parallel to the longitudinal portion 81 of the box body 65.

Further, the distance between the first axis 92 and the second rotation axis 88 is substantially the same as the distance between the second axis 93 and the first rotation axis 87.

The rotation axis 88 is arranged at a separating distance H from the connecting axis 160, whilst the further rotation axis 87 is arranged at a further separating distance J from the further connecting axis 161.

As is visible in FIG. 17, the further separating distance H and the separating distance J are substantially similar.

Each first supporting device 43, the corresponding second supporting device 44 and the corresponding connecting device 45, if they are projected onto a plane parallel to the first movement plane A, for example onto the plane in FIG. 13, define three consecutive sides of an articulated parallelogram device. In particular, a first side of the articulated parallelogram device is defined by an arm comprising the first supporting bracket 53 and the longitudinal portion 81 of the box body 65. A second side of the articulated parallelogram device, opposite the first side, is defined by a further arm comprising the second supporting bracket 60. The supporting element 68 and the hollow element 67 define a member forming a third side of the articulated parallelogram. The end hole 55 and the further end hole 62, which are separated by a substantially constant distance equal to the distance D, ideally define a fourth theoretical side of the articulated parallelogram. The aforesaid fourth theoretical side is moved by the chain 13 and by the further chain 38 in such a way as to remain constantly parallel to itself and substantially horizontal.

Owing to the articulated parallelogram disclosed above, the upper surface 76 of the supporting element 68 is in a substantially horizontal position in any point that is reachable by the connecting devices 45 during the path of the chain 13 and of the further chain 38.

The first adjustable bracket 46 and the second adjustable bracket 57 respectively prevent the first supporting bracket 53 and the second supporting bracket 60 from rotating with respect to the chain 13 and the further chain 38.

In this way, the second end zone 56 of the first supporting bracket 53, the longitudinal portion 81 of the box body 65 and the further second end zone 63 of the second supporting bracket 60 remain substantially perpendicular to the chain 13 and to the further chain 38 during the path thereof.

Also the sleeve 64, which is fixed with respect to the box body 65, is maintained substantially perpendicular to the external wall 28 of the conduit 21, thus succeeding in entering the internal cavity 34 without difficulty.

The articulated parallelogram disclosed above, the first adjustable bracket 46 and the second adjustable bracket 57 act as control elements for maintaining the upper surface 76 of the supporting element 68 substantially horizontal, so that the section bar 2 can rest on the upper surface 76, or on possible accessories fixed thereto, without falling.

The first adjustable bracket 46 and the second adjustable bracket 57 can also be adjusted in such a way as to enable the apparatus 1 to operate correctly even in the event of slight clearance between the various components in contact, or in the event of slight permanent deformation of the latter.

FIG. 19 shows a side view of connecting devices 45 installed on a lower part of the end device 10.

A first connecting device 45 is in a lower position I that is the lowest position that is reachable by the connecting devices 45 during motion of the chains to which they are connected.

As can be seen, the box body 65 and the sleeve 64 are substantially arranged in a vertical direction in the lower position I.

In FIG. 14 there are shown a first supporting device 43, a second supporting device 44 and a connecting device 45 moved near the second rectilinear branch 24 of the conduit 21.

Figure 15:
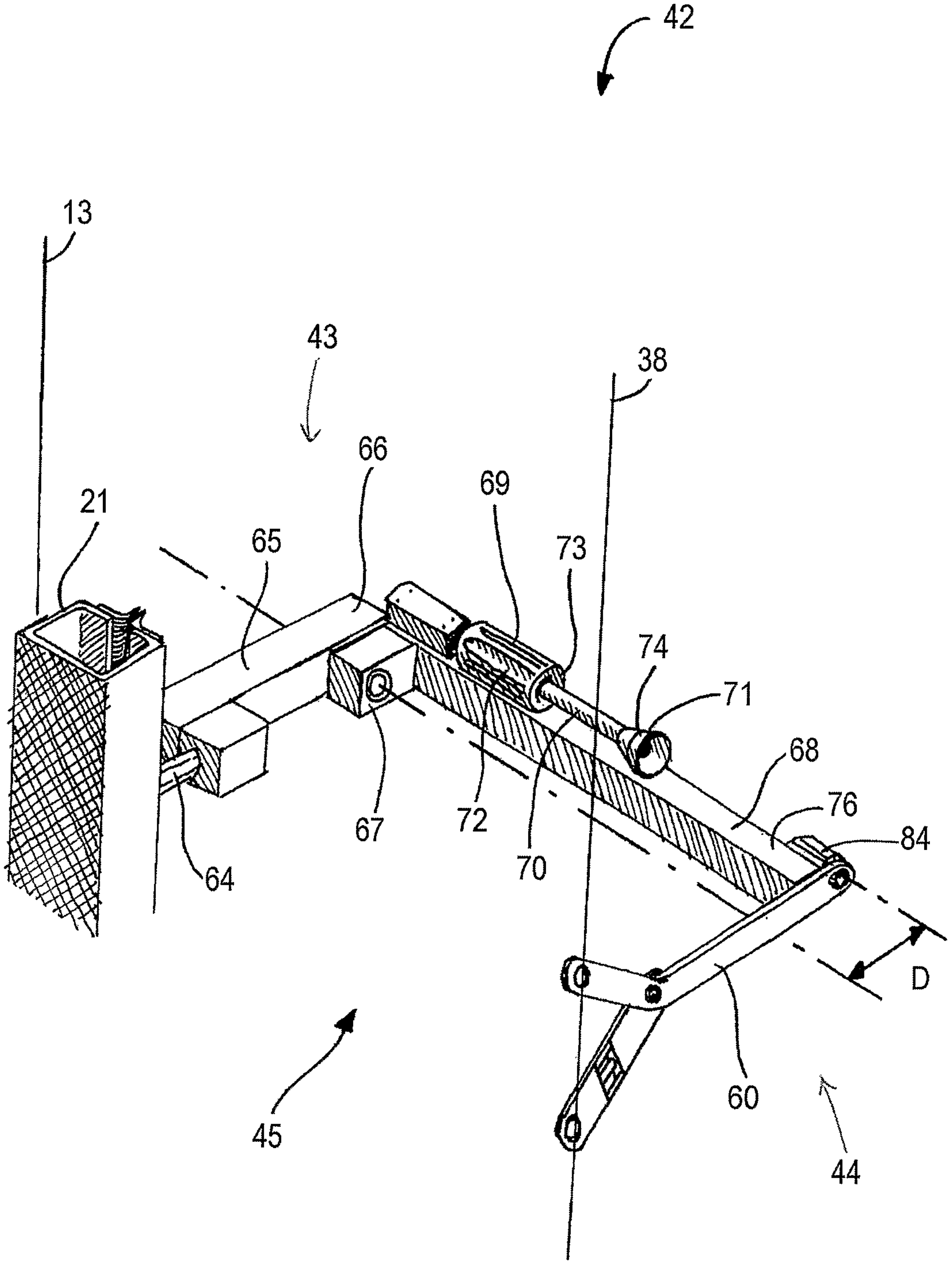
FIG. 15 is a perspective view of connecting device in a second position.

In FIG. 15, on the other hand, the aforesaid devices are shown near the first rectilinear branch 22 of the conduit 21. The further end device 11 is made in a similar and mirrored manner to the end device 10 and will not be disclosed again in detail.

The further end device 11 faces the end device 10 at a suitable distance for supporting and moving the further end portion 132 of the section bars 2.

The distance between the end device 10 and the further end device 11 is thus chosen in function of the longitudinal dimension of the section bar 2.

The further end device 11 is driven by the motor shaft 16 or by a further motor shaft rotating at the same speed as the motor shaft 16.

On the further end device 11 there are mounted first supporting devices, second supporting devices and connecting devices facing the corresponding devices included in the end device 10, in such a way that each section bar 2 moved by the conveying device 9 is constantly in a position substantially perpendicular to the first movement plane A.

During operation, in a first step of a decorating sequence of the section bars 2, the operator 3, located in the loading zone 96, transfers a section bar 2 wrapped in a tubular enclosure 134 to the conveying device 9.

The operator 3 positions the end portion 131 of the section bar 2 on a connecting device 45 of the end device 10, as shown in FIG. 16, and the further end portion 132 of the section bar 2 on a corresponding connecting device 45 of the further end device 11.

During this first step the connecting device 45 on which the operator 3 is loading the section bar 2 is in a lower part of the path of the chain 13. The sleeves 64 intended for being connected to the two open ends 133 of the tubular enclosure 134 are not yet engaged in the corresponding sleeves 21.

The operator 3 positions each of the two open ends 133 respectively near the sucking mouths 71 of two facing sucking terminals 69, as shown in FIG. 17.

Subsequently, the operator 3 slides the ring nuts 72 on the tubular elements 70 of the sucking terminals 69 to lock each of the two open ends 133 of the tubular enclosure 134 between the first conical surface 73 and the second conical surface 74 of each sucking end 69.

After the open ends 133 have been closed by the sucking terminals 69, the conveying device 9 moves the section bar 2 upwards in such a way as to take the section bar 2 to the upper part of the path of the chain 13.

Each of the two sleeves 64 arranged near the end portion 131 and near the further end portion 132 of the section bar 2 enters the corresponding conduit 21 and locally deforms the closing arrangement 29, connecting the tubular enclosure 134 to the internal cavity 34.

In this way in the zones in which the sleeve 64 is not in contact with the closing portion 30 of the conduit 21, the latter maintains the conduit 21 closed in such a way that air cannot enter it from the external environment. In the further zone in which the sleeve 64 is inserted in the conduit 21, the closing portion 30 is deformed to enable the sleeve 64 to pass.

The narrow and elongated section of the sleeve 64 enables the latter to move easily with respect to the closing portion 30, for example, by deforming the seals 31, and ensures that the closing portion 30 does not open before coming into contact with the sleeve 64 and closes again immediately after interacting with the latter, also thanks to the elastic properties of the closing arrangement 29.

Figure 22:
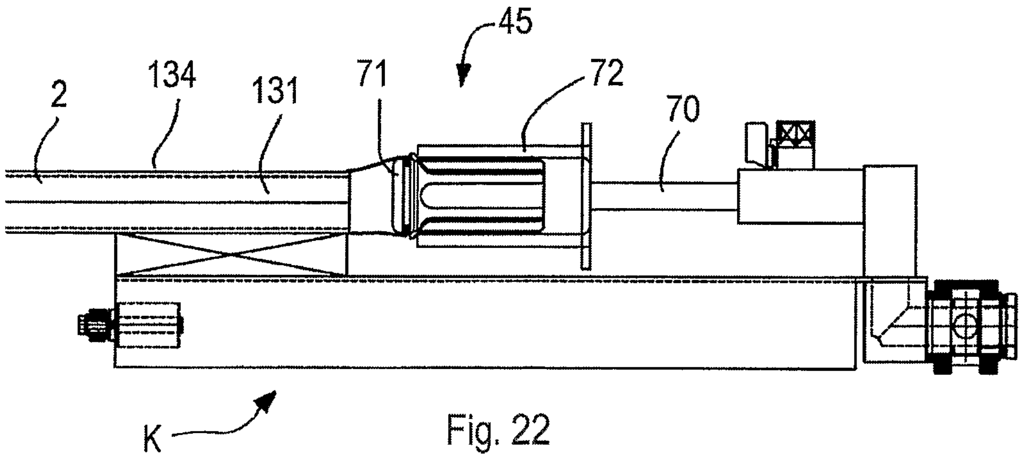

As the conduits 21 are connected to the sucking device, through the duct 75 the air is sucked that is found inside the tubular enclosure 134 and the latter adheres to the section bar 2 as shown in FIG. 22.

Whilst the section bar 2 is moved by the conveying device 9, each sleeve 64 arranged near the respective end portions 131 and further end portions 132 traverses the first rectilinear branch 22, the curved portion 23 and the second rectilinear branch 24 of the corresponding conduit 21.

Along the first rectilinear branch 22 the section bar 2 enters the chamber 20 through the inlet opening 6 of the heating device 5.

As already explained, the upper surface 76 of the supporting element 68 is in a substantially horizontal position at any point of the path of the chain 13, in such a way that the section bar 2 can simply be rested on the connecting devices 45 without the need for further locks.

Each section bar 2 remains in the chamber 20 for sufficient time to reach a temperature at which the decoration sublimates, thus transferring from the tubular enclosure 134 to the surface of the section bar 2.

Whilst the corresponding sleeves 64 traverse the second rectilinear branch 22, the section bar 2 exits the chamber 20 through the outlet opening 7.

In an embodiment, an end region of the second rectilinear branch 22 near the outlet opening 7, instead of being connected to the sucking device, can be connected to a blowing device, which enables air to be blown into the used tubular enclosure 134 to detach it from the already decorated section bar 2.

After each sleeve 64 has disengaged from the second rectilinear branch 24 of the corresponding conduit 21, the section bar 2 is ready to be unloaded from the apparatus 1.

An operator 3, located in an unloading zone 100, releases each of the two open ends 133 of the tubular enclosure 134 from the sucking terminals 69 and removes the section bar 2 wrapped in the tubular enclosure 134 to deposit it on the unloading plane 4 and then direct it to storage positions.

Generally, the section bars 2 are decorated before being cut, for example to make door and window frames.

For this reason, the section bars 2 decorated in the apparatus 1 usually have a very extended longitudinal dimension, and the weight thereof may cause them to bend dangerously when rested on a pair of connecting devices 45 facing one other.

In order to prevent the section bars 2 from getting damaged by bending excessively, it is possible to provide the conveying device 9 with a central resting device 103, shown in FIGS. 23 to 26, situated in an intermediate position between the end device 10 and the further end device 11.

The central resting device 103 is provided with a plurality of supporting planes 105 for supporting a central portion 104 of the section bars 2 whilst the latter are moved.

The central resting device 103 comprises two side portions 107 that are similar to the second portion 37 of the end device 10.

Each of the side portions 107 is provided with a still further chain, which is not shown, which is moved in the same manner as already disclosed for the second portion 37 along a path similar to that taken by the chain 13 and by the further chain 38 of the end device 10 and of the further end device 11.

Each still further chain moves along a path lying on a plane parallel to the first movement plane A.

Figure 23:
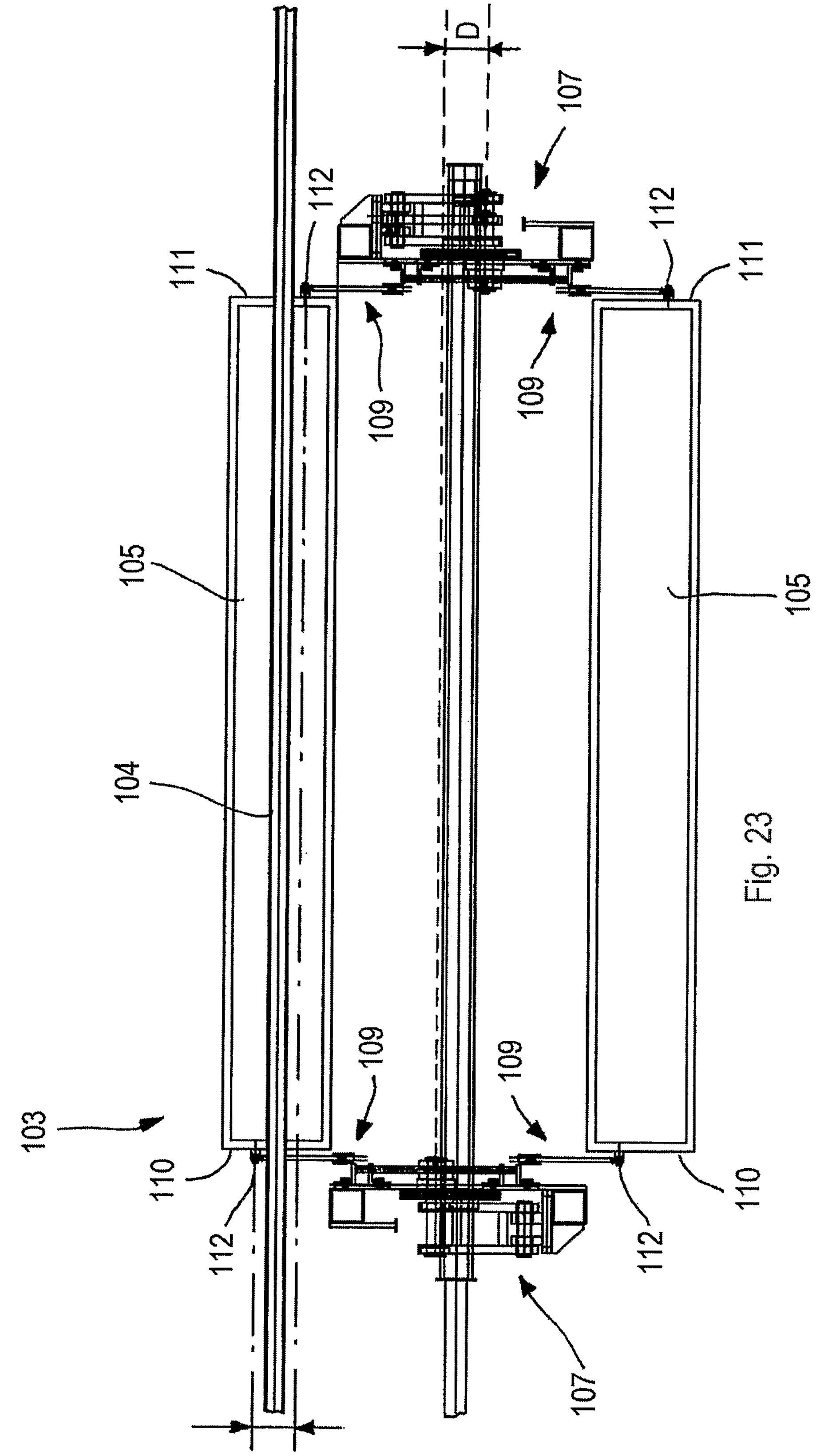
FIG. 23 is a plan view of a central supporting device of the apparatus in FIG. 5.

The side portions 107 face one another in such a way that corresponding points of each side portion 107, if they are projected on the first movement plane A, are separated by a distance equal to the distance D, as shown in FIG. 23.

On both sides of each supporting plane 105 there is mounted a further supporting device 109, similar to the second supporting devices 44, for supporting and moving the corresponding supporting plane 105.

Each supporting plane 105 is provided with a first side wall 110 and a second side wall 111 to each of which there is fixed a lateral stem 112 arranged for rotatably coupling with the corresponding further supporting device 109.

The lateral stems 112 extend along respective axes that are parallel to one another substantially spaced by the distance D, as shown in FIG. 23.

In this way, the central resting device 103 is capable, according to the same methods disclosed previously for the upper surfaces 76, of moving the supporting planes 105 whilst maintaining them horizontal.

The section bars 2 can thus rest on the supporting plane 105, in addition to on the connecting devices 45 of the first end device 10 and of the end device 11, which prevents the central portion 104 of the section bars 2 from flexing.

Figures 24, 25, 26:
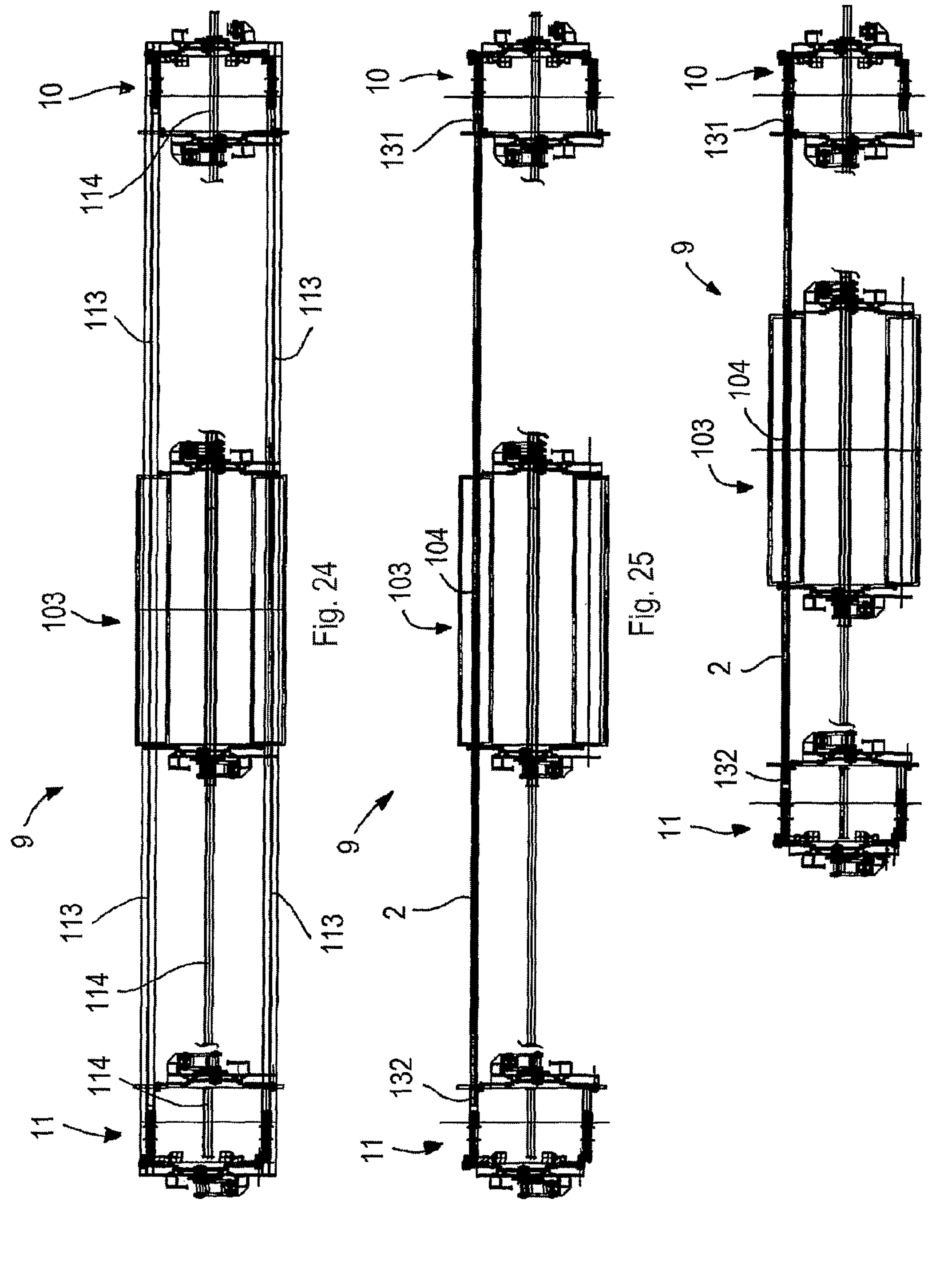
FIG. 24 is a plan view of conveying devices of the apparatus in FIG. 5.
FIGS. 25 and 26 are plan views of the conveying devices in FIG. 24 adapted for conveying elongated elements that have longitudinal dimensions that are different from one another.

In order to decorate batches of section bars 2 of different longitudinal dimensions with the same apparatus 1, the conveying device 9 can be provided with a pair of rails 113, shown in FIG. 24, on which are installed the end device 10, the further end device 11 and the central resting device 103. More in particular, the end device 10 can be fixed with respect to the rails 113, whilst the further end device 11 can move along the rails 113.

The further end device 11 is thus positionable at a distance from the end device 10 that is suitable for decorating a batch of section bars 2 provided with a certain longitudinal dimension.

Also the central resting device 103 is movable on the rails 113 and can be positioned in an intermediate position between that occupied by the end device 10 and that occupied by the further end device 11.

In this case the chains included in the end device 10, in the further end device 11 and in the central resting device 103 can be moved by a single telescopic drive shaft 114, having a length that can be varied according to the longitudinal dimension of the section bars 2 to be decorated.

FIGS. 25 and 26 show how the position occupied by the further end device 11 and by the central resting device 103 can vary to decorate, via the apparatus 1, section bars 2 of different longitudinal dimensions.

In particular, FIG. 25 shows a maximum extent configuration of the apparatus 1 in which the further end device 11 is positioned as far as possible from the end device 10. The maximum extent configuration is the one in which the section bars with a greater longitudinal dimension can be decorated. FIG. 26 on the other hand shows an intermediate extent configuration for decorating section bars 2 with a lesser longitudinal dimension.

Although in the preceding description reference has always been made to decorations of section bars, it is understood that the apparatus 1 can also be used for decorating objects of different type, for example web-shaped elements such as sheet metal. In the latter case the sheet metal, instead of being wrapped in a tubular enclosure made with the plastic film bearing the sublimable decoration, can be covered with a sheet of plastic film, in such a way as to be decorated only on a face thereof intended to remain in view.

The invention claimed is:

1. Apparatus comprising a conveying device for conveying an object associated with a sheet bearing a sublimable design, a conduit element for sucking air between said sheet and said object through a connecting device, wherein said conduit element is provided with a slit that extends for the entire length of the conduit element, said slit being provided with a closing arrangement for the entire length thereof, said closing arrangement defining a closing portion of said conduit element, said connecting device comprising a component which is movable inside said slit so as to interact with successive zones of said closing portion and to deform in sequence such successive zones, wherein said closing arrangement is made of elastic material so as to be deformed elastically when it interacts with said connecting device.

2. Apparatus according to claim 1, wherein said closing arrangement comprises a first closing arrangement and a second closing arrangement mounted along opposite edge zones of said slit.

3. Apparatus according to claim 2, wherein said first closing arrangement and said second closing arrangement are provided with respective end portions that project to the outside of said conduit element in such a way as to be in contact with one another along a plane of symmetry of said slit.

4. Apparatus according to claim 3, wherein said end portions become progressively thinner from said edge zones to said plane of symmetry.

5. Apparatus according to claim 3, wherein said end portions are provided with a substantially cylindrical cross section.

6. Apparatus according to claim 1, wherein said component is a tubular component and is arranged for partially penetrating said conduit element by deforming said successive zones.

7. Apparatus according to claim 6, wherein said tubular component has an elongated cross section, having a greater dimension parallel to an advance direction of the tubular component along said slit.

8. Apparatus according to claim 1, wherein said conveying device comprises a supporting surface for supporting said object, there being further provided a control arrangement for maintaining said supporting surface substantially parallel to itself in a closed path along which said conveying device is movable.

9. Apparatus according to claim 8, wherein said control arrangement is such as to maintain said supporting surface substantially horizontal along said closed path.

10. Apparatus according to claim 8, wherein said conveying device comprises a loop conveyor and a further loop conveyor that are movable on respective movement planes that are parallel to one another.

11. Apparatus according to claim 10, wherein said control arrangement comprises an arm device having an arm and a further arm that are rotatably connected to a member with which said supporting surface is associated.

12. Apparatus according to claim 11, wherein said arm and said further arm are substantially parallel.

13. Apparatus according to claim 11, wherein said arm is movable on a plane distanced from a further plane wherein said further arm is movable.

14. Apparatus according to claim 11, wherein said arm has an end zone connected to said loop conveyor along a connecting axis and said further arm has a further end zone connected to said further loop conveyor along a further connecting axis arranged at a distance from said connecting axis.

15. Apparatus according to claim 14, wherein said arm has an end region rotatably connected to said member along a rotation axis and said further arm has a further end region rotatably connected to said member along a further rotation axis, said rotation axis and said further rotation axis being separated by said distance.

16. Apparatus according to claim 15, wherein said rotation axis is arranged at a separating distance from said connecting axis, said separating distance being substantially the same as a further separating distance defined between said further rotation axis and said further connecting axis.

17. Apparatus according to claim 11, wherein said control arrangement comprises an elongated element connecting a central zone of said arm to said loop conveyor.

18. Apparatus according to claim 17, wherein said elongated element has an adjustable length.

19. Apparatus according to claim 17, wherein said control arrangement comprises a further elongated element connecting a further central zone of said further arm to said further loop conveyor.

20. Apparatus according to claim 19, wherein said further elongated element has an adjustable length.

21. Apparatus according to claim 20, wherein said supporting surface is obtained on said member.

22. Apparatus according to claim 20, wherein said supporting surface is obtained on an accessory element fixed to said member.

23. Apparatus according to claim 11, wherein said member comprises a first part substantially parallel to said arm and a second part arranged transversely to said first part to connect said first part to said further arm.

24. Apparatus according to claim 23, wherein said connecting device comprises a conduit passing through said member and said arm.

25. Apparatus according to claim 24, wherein said conduit extends inside said first part.

26. Apparatus according to claim 24, wherein said arm comprises a bracket fixed to a boxed body connected to said first part by means of a rotating joint, said conduit extending along said boxed body.

27. Apparatus according to claim 24, and further having a sucking opening for sucking air inside a tubular enclosure made with said sheet and wrapping said object.

28. Apparatus according to claim 27, wherein said sucking opening is associated with said member in such a way as to communicate with said conduit.

29. Apparatus according to claim 1, wherein said conveying device is such as to move said object mainly in a vertical direction.

30. Apparatus according to claim 1, and further comprising a heating device for heating said sheet to a sublimation temperature of said sublimable design.

* * * * *